United States Patent [19]
Toju et al.

[11] Patent Number: 5,774,570
[45] Date of Patent: Jun. 30, 1998

[54] DOCUMENT PROCESSING SYSTEM WITH AN IMAGE EDITING FUNCTION

[75] Inventors: Yasuko Toju, Edogawa-ku; Naoki Hayashi, Nakai-machi, both of Japan

[73] Assignee: Fuji Xerox Co., Ltd., Tokyo, Japan

[21] Appl. No.: 657,107

[22] Filed: Jun. 3, 1996

[30] Foreign Application Priority Data

Aug. 18, 1995 [JP] Japan .................................. 7-232060

[51] Int. Cl.[6] .................................................. G06K 9/00
[52] U.S. Cl. .......................................... 382/112; 707/523
[58] Field of Search .................................. 382/100, 112, 382/317; 395/785, 791; 345/141, 143, 471, 472; 358/447, 448, 452, 470, 537; 707/523, 529

[56] References Cited

U.S. PATENT DOCUMENTS

| | | | |
|---|---|---|---|
| 4,292,622 | 9/1981 | Henrichon, Jr. | 340/146.3 SG |
| 5,105,266 | 4/1992 | Telle | 358/80 |
| 5,151,954 | 9/1992 | Takai et al. | 382/41 |
| 5,153,737 | 10/1992 | Kobayashi | 358/296 |
| 5,248,964 | 9/1993 | Edgard et al. | 345/114 |
| 5,293,473 | 3/1994 | Hesse et al. | 395/146 |
| 5,311,336 | 5/1994 | Kurita et al. | 358/80 |
| 5,436,735 | 7/1995 | Tanabe et al. | 358/453 |
| 5,485,288 | 1/1996 | Kamei et al. | 358/530 |

FOREIGN PATENT DOCUMENTS

| | | | |
|---|---|---|---|
| 0 349 780 | 1/1990 | European Pat. Off. | H04N 1/46 |
| 0 454 964 | 11/1991 | European Pat. Off. | G06F 15/20 |
| 0 501 814 | 9/1992 | European Pat. Off. | H04N 1/40 |
| 62-222294 | 9/1987 | Japan | G09G 1/28 |
| WO 81/02482 | 9/1981 | WIPO | G06K 9/34 |
| WO 91/08642 | 6/1991 | WIPO | H04N 1/46 |

*Primary Examiner*—Andrew W. Johns
*Attorney, Agent, or Firm*—Oliff & Berridge, PLC

[57] ABSTRACT

A document processing system is operative to switch easily the scheme of emphasis and distinction of certain elemental contents of a document between the multicolor scheme and the monochrome multi-shape scheme based on key-markers that do not appear as special command symbols in the document. The system comprises an element information register means which holds first information and second information which determine the visual feature of document elements, first default value register means which holds a default value of the first information, a discrimination means which detects as to whether or not the first information of a document element held by the element information register means is different from the default value, and a setting means which sets the second information for a document element with first information that is different from the default value.

24 Claims, 35 Drawing Sheets

| ELEMENT CATEGORY | ORIGINAL KEY-MARKER INFORMATION | | REVISIONAL SET-MARKER INFORMATION | | REVISIONAL KEY-MARKER VALUE |
|---|---|---|---|---|---|
| | ATTRIBUTE (KEY-MARKER) | VALUE | ATTRIBUTE (SET-MARKER) | VALUE | |
| CHARACTER | FONT | GOTHIC-TYPE | COLOR | [0, 0, 80] | DEFAULT VALUE |
| CHARACTER | FONT | BOLD-TYPE | COLOR | [10, 10, 70] | INTACT |
| CHARACTER | COLOR | B'>G'>R' | FONT | | DEFAULT VALUE |
| CHARACTER | COLOR | R'>G'>B' | FONT | | INTACT |
| ... | ... | ... | ... | ... | ... |

| PERSON ON DUTY (JULY TO SEPTEMBER) | | |
|---|---|---|
| JULY | 1ST TO 15TH | KATO |
| | 15TH TO 31ST | SUZUKI |
| AUGUST | 1ST TO 10TH | YAMASHITA |
| | 11TH TO 20TH | YAMASHITA |
| | 21ST TO 31ST | YAMASHITA |
| SEPTEMBER | 1ST TO 10TH | KATO |
| | 11TH TO 20TH | SUZUKI |
| | 21ST TO 30TH | YAMASHITA |

⬇

173

174

175

| PERSON ON DUTY (JULY TO SEPTEMBER) | | |
|---|---|---|
| JULY | 1ST TO 15TH | KATO |
| | 15TH TO 31ST | SUZUKI |
| AUGUST | 1ST TO 10TH | YAMASHITA |
| | 11TH TO 20TH | YAMASHITA |
| | 21ST TO 31ST | YAMASHITA |
| SEPTEMBER | 1ST TO 10TH | KATO |
| | 11TH TO 20TH | SUZUKI |
| | 21ST TO 30TH | YAMASHITA |

FIG.17

| ORIGINAL KEY-MARKER (THICKNESS) CONDITION | REVISIONAL SET-MARKER (COLOR) VALUE | REVISIONAL KEY-MARKER (THICKNESS) VALUE |
|---|---|---|
| SMALLER THAN DEFAULT VALUE | [128, 128, 204] | DEFAULT VALUE |
| GREATER THAN DEFAULT VALUE | [32, 32, 128] | INTACT |

PERSON ON DUTY (JULY TO SEPTEMBER)

| JULY | 1ST TO 15TH | KATO |
|---|---|---|
|  | 15TH TO 31ST | SUZUKI |
| AUGUST | 1ST TO 10TH | YAMASHITA |
|  | 11TH TO 20TH | YAMASHITA |
|  | 21ST TO 31ST | YAMASHITA |
| SEPTEMBER | 1ST TO 10TH | KATO |
|  | 11TH TO 20TH | SUZUKI |
|  | 21ST TO 30TH | YAMASHITA |

291, 292

⬇

293

PERSON ON DUTY (JULY TO SEPTEMBER)

| JULY | 1ST TO 15TH | KATO |
|---|---|---|
|  | 15TH TO 31ST | SUZUKI |
| AUGUST | 1ST TO 10TH | YAMASHITA |
|  | 11TH TO 20TH | YAMASHITA |
|  | 21ST TO 31ST | YAMASHITA |
| SEPTEMBER | 1ST TO 10TH | KATO |
|  | 11TH TO 20TH | SUZUKI |
|  | 21ST TO 30TH | YAMASHITA |

| IDENTIFIER | LINE DOT ADDRESS | LONG-SIDE LENGTH | SHORT-SIDE LENGTH | COLOR VALUE |
|---|---|---|---|---|
| 1 | 10, 11, 12, ... | 1000 | 10 | [255, 255, 204] |
| 2 | 30, 31, 32, ... | 1000 | 10 | [16, 16, 180] |
| ... | ... | ... | ... | ... |

FIG.32

PERSON ON DUTY (JULY TO SEPTEMBER)

| JULY | 1ST TO 15TH | KATO |
|---|---|---|
| | 15TH TO 31ST | SUZUKI |
| AUGUST | 1ST TO 10TH | YAMASHITA |
| | 11TH TO 20TH | YAMASHITA |
| | 21ST TO 31ST | YAMASHITA |
| SEPTEMBER | 1ST TO 10TH | KATO |
| | 11TH TO 20TH | SUZUKI |
| | 21ST TO 30TH | YAMASHITA |

⬇

PERSON ON DUTY (JULY TO SEPTEMBER)

| JULY | 1ST TO 15TH | KATO |
|---|---|---|
| | 15TH TO 31ST | SUZUKI |
| AUGUST | 1ST TO 10TH | YAMASHITA |
| | 11TH TO 20TH | YAMASHITA |
| | 21ST TO 31ST | YAMASHITA |
| SEPTEMBER | 1ST TO 10TH | KATO |
| | 11TH TO 20TH | SUZUKI |
| | 21ST TO 30TH | YAMASHITA |

FIG.35

DOCUMENT PROCESSING SYSTEM WITH AN IMAGE EDITING FUNCTION

BACKGROUND OF THE INVENTION

1. Field of the Invention

The present invention relates to a document processing system, and particularly to a color document producing system, such as a word-processor or digital copy machine, which can deal with multiple colors.

2. Description of the Related Art

Recent advanced word-processors and document editors installed in workstations have made it easy to produce documents. Enhanced document creating functions of these facilities have enabled the easy creation of multicolor documents and the printing of color documents.

For the ease of reading a document, some parts of the document are made conspicuous or some parts of the document are made distinct from others by using multiple colors or by using multiple monochrome shapes. Specifically, characters or underlines of portions to be made conspicuous are colored or the background of these portions are colored, or a different font or different character size is used for these characters in the case of a monochrome document. Alternative schemes include the character ornamentation (e.g., underlining), background ornamentation (e.g., color inversion between the foreground and background) and different kinds of lines, and these schemes may be combined.

However, the scheme of emphasis and distinction that can be used for the content of a document is dependent on the performance of each document creating system which consists of a document entry and editing unit, such as a word-processor, and an output unit, such as a printer. For example, a document entered and edited with a monochrome word-processor cannot yield a color-printed document even with a color printer, or a document entered and edited with a color word-processor cannot yield a color-printed document with a monochrome printer.

For coping with these problems, there has been proposed an information delivering system which deals with a monochrome document, with symbolic commands of color change for underlines and certain areas of document being written on it, and produces a document by changing the color for the portions specified by the command symbols, as described in Japanese patent publication No. Sho 62-222294 (1987). Accordingly, this system allows the user to print a color document from an original monochrome document.

However, the information delivering system of the above-mentioned patent publication still has the following problems left unsolved. When a document, with symbolic commands of color change for certain portions being written on it, is printed as a monochrome document, these command symbols are unavoidably printed as part of the content of document. This system only performs monochrome-to-color conversion, and is not capable of producing a monochrome document from an original color document. Specifically, when a multicolor document input unit and a monochrome printer are available, the multicolor function of the document input unit is still useless. Although this system is capable of adding the scheme of emphasis and distinction of document portions based on the multicolor scheme to an original monochrome document created based on the multi-shape ornamentation scheme, it cannot add the multi-shape scheme to an original document created based on the multicolor ornamentation scheme.

SUMMARY OF THE INVENTION

The present invention is intended to solve the foregoing prior art problems, and its prime object is to provide a document processing system which is operative to switch easily for the scheme of emphasis and distinction of the document content from the multicolor scheme to the monochrome multi-shape scheme, and vice versa, and capable of producing a document in which special command symbols are not added.

Another object of this invention is to provide a document processing system which is operative to add easily another of the multicolor scheme and monochrome multi-shape scheme for the emphasis and distinction of the document content to an existing scheme that is already used in the document.

In order to achieve the above objectives, the inventive document processing system comprises an element information register means which holds first information and second information which determine the visual features of a document element, a first default value register means which holds a default value of the first information, a discrimination means which detects whether or not the first information of the document element held by the element information register means is different from the default value, and a setting means which sets the second information for a document element with first information that is different from the default value.

The inventive document processing system of another form comprises an element information register means which holds first information and second information which determine the visual features of a document element, a first default value register means which holds a default value of the first information, a second default value register means which holds a default value of the second information, a discrimination means which detects as to whether or not the first information of a document element held by the element information register means is different from the default value, and a setting means which sets the second information to be a value other than the default value for a document element with first information that is different from the default value.

In the inventive document processing systems, the setting means sets the second information for a document element with first information that is different from the default value and sets the first information of said document element to be a default value.

The inventive document processing system further includes a document layout means which alters the layout of a document element in response to the alteration of the first information or second information of the document element held in the element information register means.

The inventive document processing system further includes a first analysis means which determines a default value of the first information by using the first information of the document element held in the element information register means.

The inventive document processing system further includes a second analysis means which determines a default value of the second information by using the second information of the document element held in the element information register means.

In the inventive document processing system, the setting means enables the user to specify in an interactive manner the correspondence between the first information before the alteration (will be termed "original") and the first information and second information after the alteration (will be termed "revisional").

The inventive document processing system of another form further includes a setting register means which holds information indicative of the correspondence between the original first information and the revisional first information and second information, and the setting means implements the setting by using the information held by the setting register means.

In the inventive document processing system, a document element to be treated is any of characters or a line of a figure or a table, and information which determines the visual feature of the document element is characters or the shape or color of a line. The first information which determines the visual feature of a document element handles the shape of the document element, and the second information which determines the visual feature of the document element handles the color of the document element. Alternatively, the first information which determines the visual feature of a document element handles the color of the document element, and the second information which determines the visual feature of the document element handles the shape of the document element.

In the inventive document processing system of the various forms, the element information register means holds the first and second information which determine the visual features of a document element, and the first default value register means holds a default value of the first information. The identifying means detects whether or not the first information of the document element held by the element information register means is different from the default value, and in response to the detection of difference, the setting means sets the second information for a document element with first information different from the default value.

In the inventive document processing system of another form, the element information register means holds first and second information which determine the visual features of a document element, the first default value register means holds a default value of the first information, and the second default value register means holds a default value of the second information. The identifying means detects whether or not the first information of a document element held by the element information register means is different from the default value, and in response to the detection of difference, the setting means sets a value other than the default value to the second information for a document element with first information different from the default value. The setting means sets the second information for a document element with first information different from the default value, and sets the first information of the document element to be a default value.

The inventive document processing system further includes a document layout means, which alters the layout of a document element in response to the alteration of the first information or second information of the document element held in the element information register means.

The inventive document processing system further includes a first analysis means, which determines a default value of first information by using the first information of the document element held in the element information register means. In another form, the system further includes a second analysis means, which determines a default value of second information by using the second information of the document element held in the element information register means.

The setting means enables the user to specify in an interactive manner the correspondence between the original first information and the revisional first information and second information. The system includes a setting register means, and in case the setting register means is holding the information of the correspondence, the setting means implements the setting by using the information held by the setting register means.

According to the inventive document processing system, it is possible to switch easily the scheme of emphasis and distinction for a document elements in a document between the multicolor scheme and monochrome multi-shape scheme. Specifically, for the switching from the monochrome multi-shape scheme to the multicolor scheme, a revisional color and shape are determined for a shape other than the default value appearing in the document, and the color and shape for the document element are determined based on their correspondence. For the switching from the multicolor scheme to the monochrome multi-shape scheme, a revisional shape and color are determined for a color other than the default value appearing in the document, and the color and shape for the document element are determined based on their correspondence.

According to the inventive document processing system, it is possible to add easily another of the multicolor scheme and monochrome multi-shape scheme for the emphasis and distinction of a document elements to an existing scheme that is already used in the document. Specifically, for the addition of the multicolor scheme to a document in which the monochrome multi-shape scheme is used, the revisional color is determined for a shape other than the default value appearing in the document, and the color of a document element is determined based on their correspondence. For the addition of the monochrome multi-shape scheme to a document in which the multicolor scheme is used, the revisional shapes is determined for a color other than the default value appearing in the document, and the shape of the document element is determined based on their correspondence.

For the switching or addition of these schemes, the correspondence between the original color and shape and the revisional color and shape is specified by the user or determined based on correspondence information registered in advance. For the case of unpredictable default values for the color and shape in a document, default values of color and shape are given along with the content of document. For the case in need of alteration of the layout of a document element (characters and line) due to the alteration of shape, the re-layout process takes place.

BRIEF DESCRIPTION OF THE DRAWINGS

FIG. 10 is a diagram showing an example of the automatic setting table;

FIG. 17 is a diagram used to explain the process of switching the emphasizing scheme from the thickness scheme to the color scheme for lines of figures and tables;

FIG. 24 is a diagram showing an example of the conversion table in the conversion information register means;

FIG. 29 is a diagram explaining an example of the switching of emphasizing scheme from the thickness scheme to the color scheme for a source document;

FIG. 32 is a diagram explaining the data structure of extraction information held by the extraction information register means;

FIG. 35 is a diagram explaining an example of the switching of emphasizing scheme from the color scheme to the thickness scheme for a source document;

DESCRIPTION OF THE PREFERRED EMBODIMENTS

The embodiments of the present invention will be explained in detail with reference to the drawings.

[EMBODIMENT 1]

Figure 1:
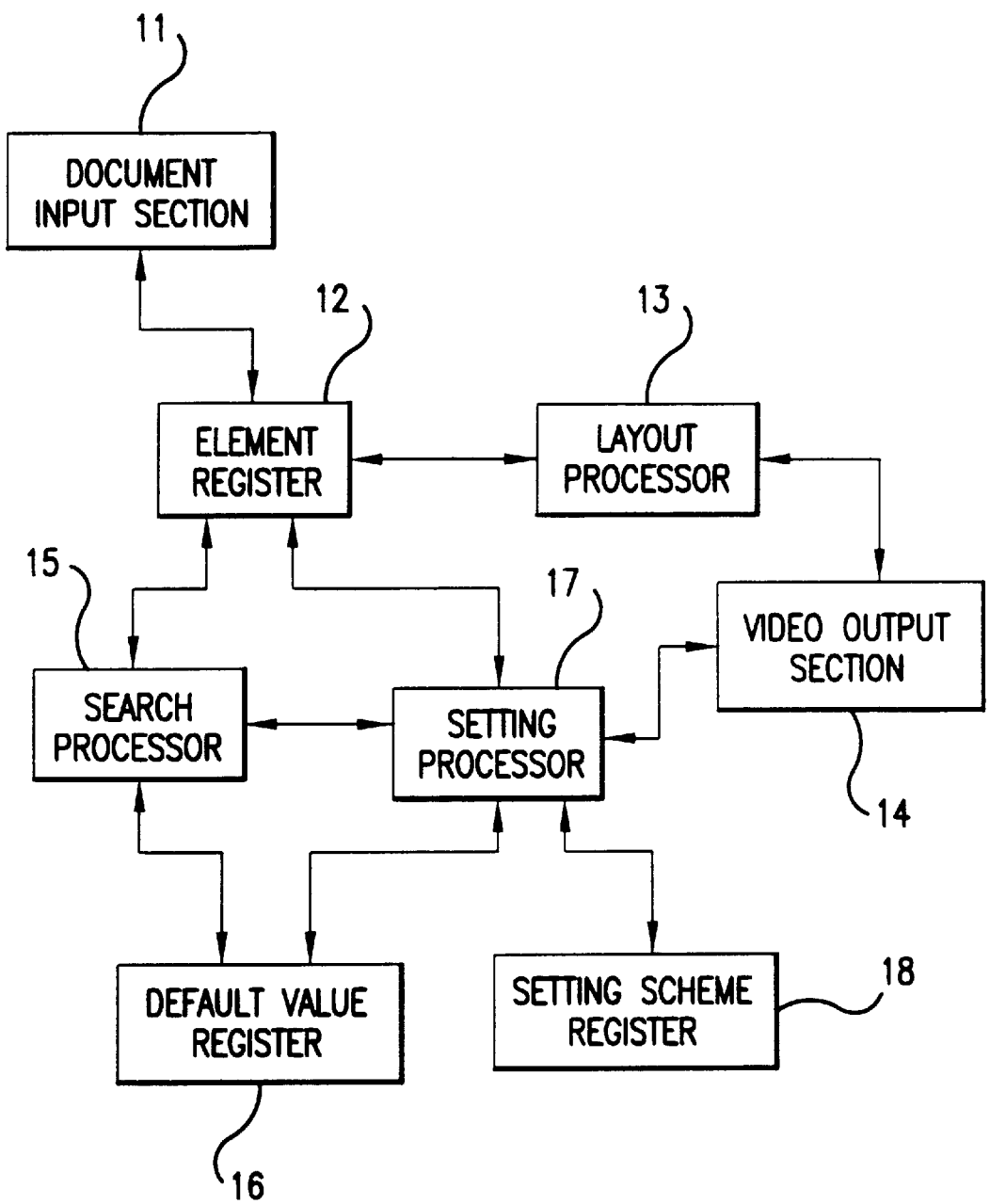
FIG. 1 is a block diagram of the document processing system based on the first embodiment of this invention.

FIG. 1 shows the configuration of the major system components of the document processing system based on the first embodiment of this invention. The system includes a document input section 11, an element register 12, a layout processor 13, an video output section 14, a search processor 15, a default value register 16, a setting processor 17, and a setting scheme register 18.

The document input section 11 receives a signal entered by the user with a keyboard or mouse device for adding a character or line to a source document and converts the signal into a string of codes, and the element register 12 holds the code string. The element register 12 also holds information on document elements and information on the general restriction of element layout, and receives, interprets and executes commands of alteration and inquiry for the information.

The element register 12 expresses each character of a document element as a set of attributes and values in terms of the character code, shape and color, and holds the character information arrangement in the order of appearance in the document. Specifically, a character is expressed in the form of a set of data (attribute and value). Colors take RGB values ranging from 0 to 100.

For example, character "a" having a font of Mincho-type, a size of 10-point and a color of blue is expressed by a set of data of attributes and values as follows:

{(category character), (code 1111), (font Mincho), (size 10-point), (color R=0, G=0, B=50)}.

A character string "ao" made up of two characters "aa" and "o" having codes 1111 and 1115, a font of Mincho, a size of 10-point and a color of blue is expressed as follows;

{(category character), (code 1111), (font Mincho), (size 10-point), (color R=0, G=0, B=50)}, {(category character), (code 1115), (font Mincho), (size 10-point), (color R=0, G=0, B=50)}.

The layout processor 13 calculates the layout of a document element based on the document element information held by the element register 12 and information on the size of character string derived from the attribute value of the document element held by the video output section 14, and holds the result of calculation. The calculation result has a form including the document element held by the element register 12 and coordinate data of a rectangular area in which the document element is laid out. For the layout of a character string, the position of the rectangular area used by the character string is determined based on the following first information through third information. The calculation for the document layout is carried out again when information on the shape of character held by the element register 12 is altered.

First information: Pertains to the number of characters and the shape of character such as the font and size, and is held in the element register 12.

Second information: Pertains to the shape, such as the size, of character to be displayed, and is held in the video output section 14.

Third information: Pertains to the restriction of layout of character on a page in connection with the margin or the like, and is held by the element register 12.

The video output section 14 implements the video output process for displaying the document image on a display device such as a CRT display unit. It holds image information derived from the attribute values of a document element, reads out layout data of the document element from the layout processor 13, and delivers the document image to the display device such as a CRT display unit.

Next, the search processor 15, default value register 16, setting processor 17 and setting scheme register 18 will be explained. The default value register 16 holds sets of a document element categories, key-markers and their default values. The state of key-marker for each category of the document element must be held in the element register 12. The key-marker is a kind of attribute held by the element register 12, and is defined as explained in the following. In contrast to the key-marker, there is used a visual feature of a document element named set-marker, and it signifies as explained in the following.

Key-marker: Represents a visual feature for characterizing a document element, and is used for altering the expression scheme of a document element as a reference in determining whether or not the visual feature of the document element takes a default value.

Set-marker: Represents a visual feature for characterizing a document element, and is used for altering the expression scheme of the document element as a reference for distinguishing visually the document element to take a default value or not after the alteration.

The setting scheme register 18 holds a set of document element category and set-marker. The set-marker is referenced by the setting processor 17 at value setting. It is a kind of attribute, and an arbitrary number of set-markers are held by the element register 12 for each category of document element.

Figure 2:
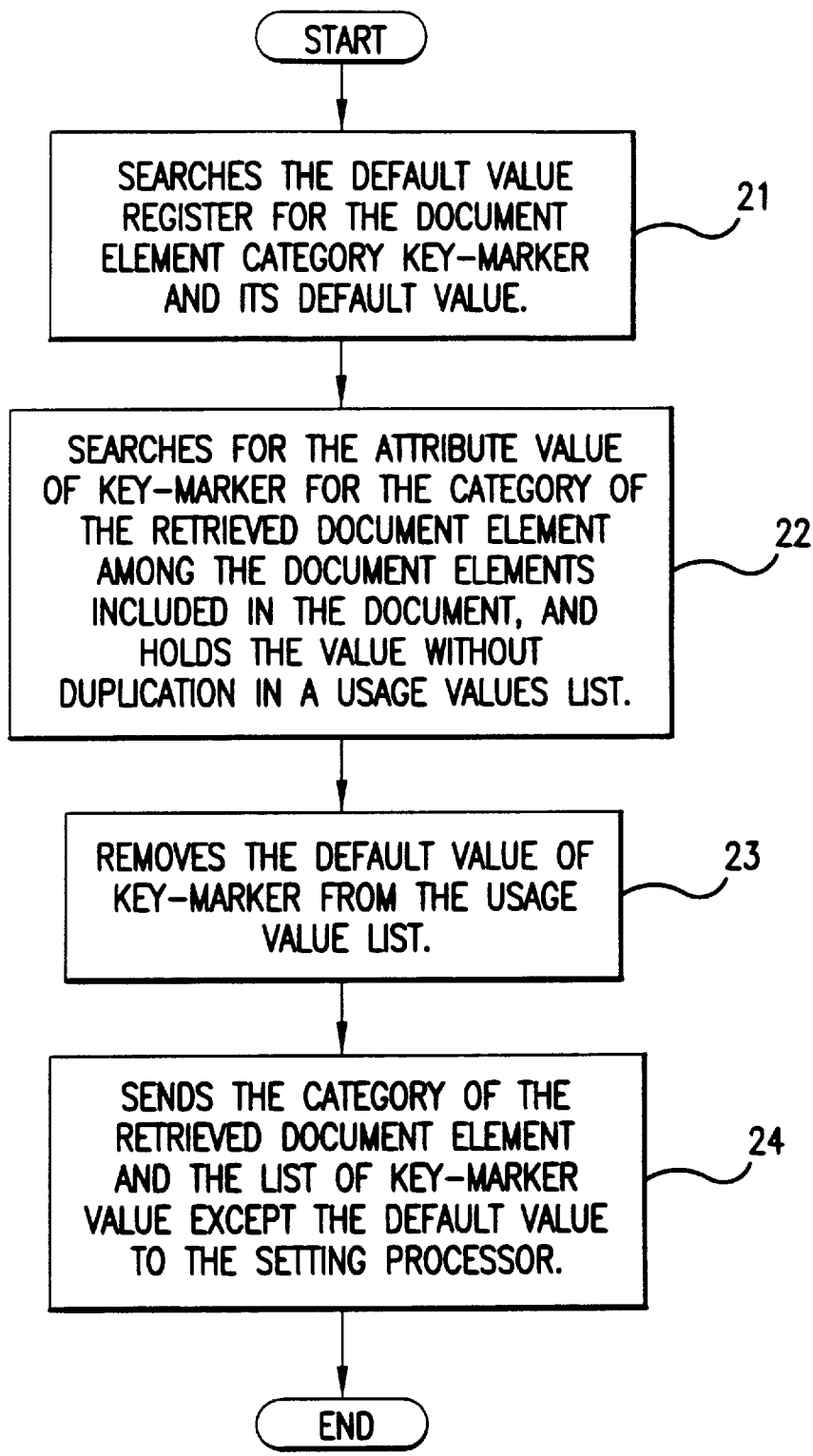
FIG. 2 is a flowchart showing the process of the search processor.

FIG. 2 shows by flowchart the process of the search processor 15 which searches for the attribute and other parameters of a document element. The first step 21 searches the default value register 16 for the document element category, key-marker and its default value. Next step 22 searches the element register 12 for the attribute value of the key-marker that is relevant to the document element category retrieved from the default value register 16, and holds the retrieved value without duplication in a usage values list.

The next step 23 removes the default value of key-marker from the usage value list which has been produced in the preceding step 22. The last step 24 sends to the setting processor 17 the document element category as a result of search by the preceding step 21 and a list of key-marker value except the default values of characters in the document resulting from the process of step 23. Consequently, a list of document element category and key-marker value except the default value is created.

Figure 3:
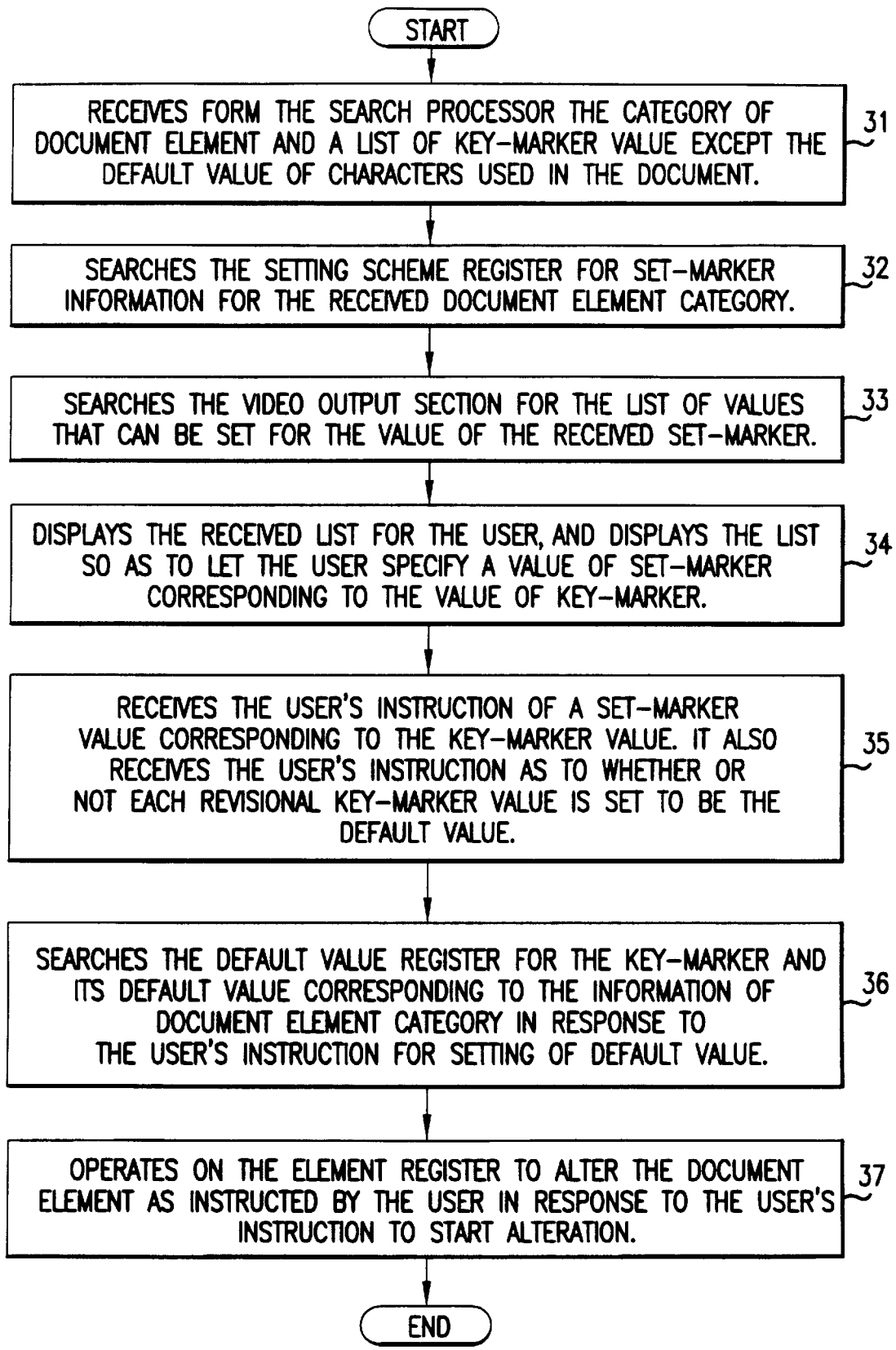
FIG. 3 is a flowchart showing the process of the setting processor.

FIG. 3 shows by flowchart the process of the setting processor 17. The first step 31 receives from the search processor 15 the category of document element and a list of key-marker value except the default value of characters used in the document. The next step 32 searches the setting scheme register 18 for set-marker information for the document element category received in the preceding step 21.

The next step 33 searches the video output section 14 for the list of values that can be set for the value of set-marker received in the preceding step 32. The next step 34 displays the list received in the preceding step 31 for the user. It displays the list received in the step 33 so as to let the user specify a value of set-marker corresponding to a value of key-marker.

The next step 35 receives the user's instruction of a set-marker value corresponding to a key-marker value. It also receives the user's instruction as to whether or not each revisional key-marker value is set to be a default value. In response to the user's instruction for setting a key-marker value to a default value, the next step 36 searches the default value register 16 for the key-marker and its default value corresponding to the information of document element category received in the preceding step 31. In response to the user's instruction of the commencement of alteration, step 37 operates on the element register 12 to alter the document element as instructed by the user in the preceding step 35.

Specifically, it indicates the alteration of the value of set-marker to the value instructed by the user a for a character having relevant value of key-marker. In case the user has instructed to make the key-marker value to be the default value, it indicates the designation of the key-marker value to be the default value, besides the alteration of the value of set-marker.

Next, the operation for the switching or addition of the scheme of document emphasis and distinction will be explained by taking specific examples of dealing with two character expression forms of the font and color for document elements used in a document.

A first example is the case of adding the scheme of emphasis and distinction based on the color to the scheme based on the font. The default value register 16 holds information "character" as a category of document element, and holds information "font" and "Mincho-type" as a key-marker and its default value. The setting scheme register 18 holds "character" as a category of document element, and holds information "color" as a set-marker. In this example, the operation for putting "color" to characters with the default value is carried out. The user specifies a color as follows.

Figure 4:
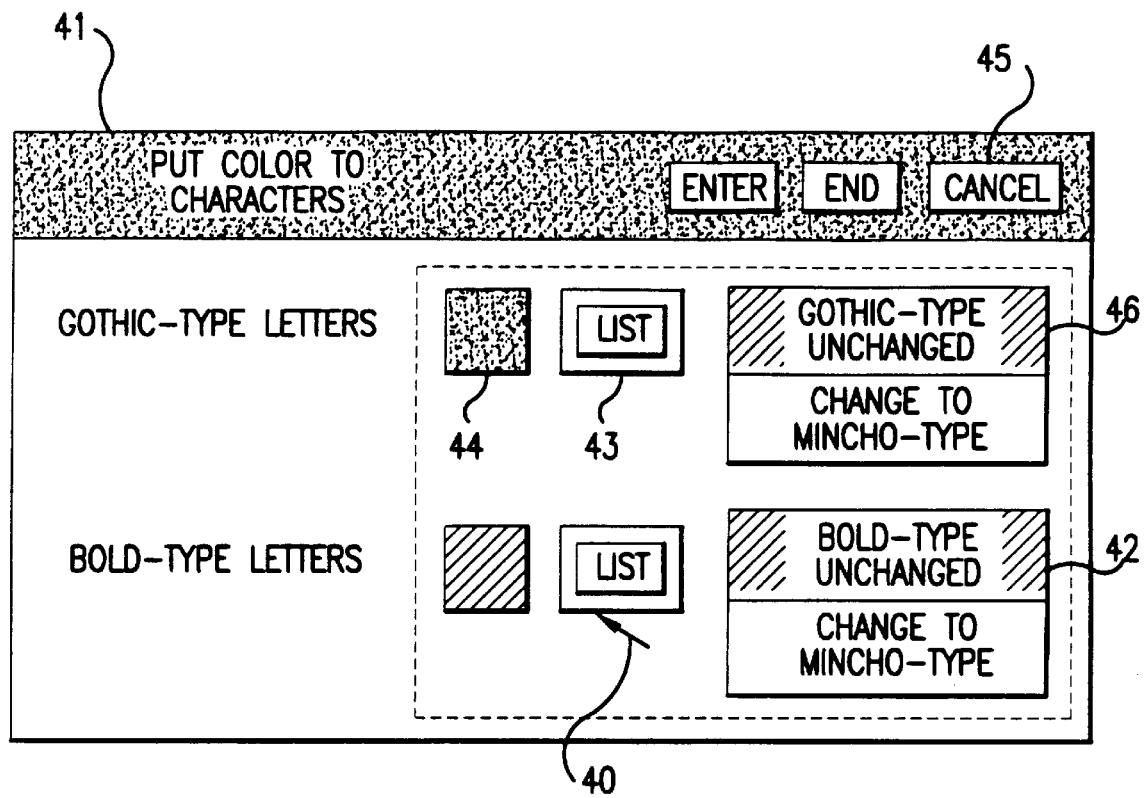
FIG. 4 is a diagram showing a first example of the user interface screen created by the setting processor.

FIG. 4 shows the user interface screen created by the setting processor 17 for this example. For the setting of character colors, values other than the default value for values of of key-markers included in the document are displayed on the left-hand section of a setting window 41 on the user interface screen. Displayed on the right of the key-marker values is a user entry field 42, in which the user specifies color information to be put to characters with key-markers other than the default value and specifies as to whether or not the key-marker is to be the default value. Namely, this is the specification of as to whether or not the color putting operation for characters with the default value is to take place. The system is initialized to have no-color (blank) for the color information field (color patch) and the selection of non-default value for the key-marker.

The user specifies the color information by pointing the color patch 44. In FIG. 4, a dual-frame field 43 with labels "list" is color patch key that is pointed by the user for displaying a list of color patches that can be selected. The list of color patches is displayed over the setting window 41 by the operation of the setting processor 17. When the user operates the mouse device to select with a pointer cursor 40 one of color patches in the list or point a position outside the color patch, the color patch list goes off. The color selected by the user is displayed in the rectangular field of color patch 44 on the left of the color patch key field 43.

Next, the case of switching the scheme of emphasis and distinction from the font scheme to the color scheme will be explained. This case is similar to the addition of the color scheme to the font scheme explained previously, and is only different in that for the selection field 42 of FIG. 4, the setting of the key-marker value to the default value is selected unconditionally by the operation of the setting processor 17.

Next, the case of switching the scheme of emphasis and distinction from the color scheme to the font scheme will be explained. In this case, the default value register 16 holds information "character" for the category of document element and holds information "color" for the key-marker. It also holds values R=0, G=0 and B=0 for the default value of color. The setting scheme register 18 holds information "character" for the category of document element and holds information "font" for the set-marker. In this example of adding (altering) the attribute of font for characters of document element, the attribute of font of the characters is set.

Figure 5:
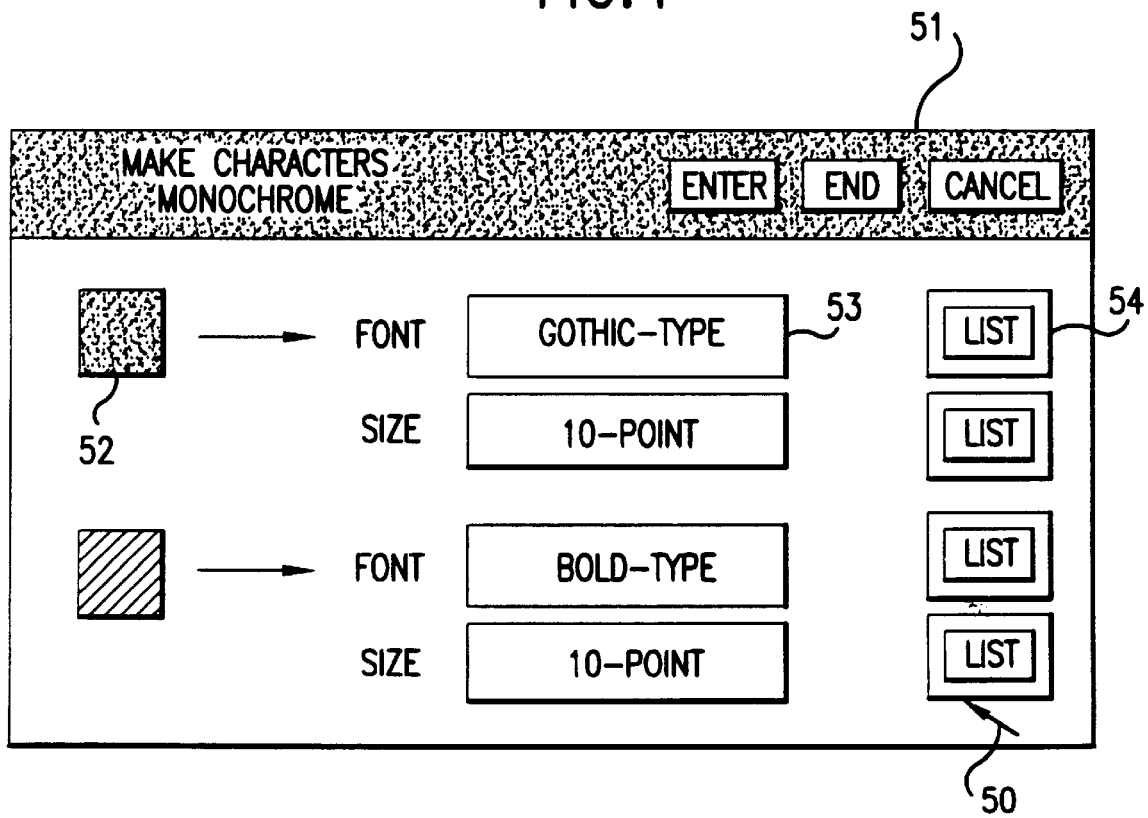
FIG. 5 is a diagram showing a second example of the user interface screen created by the setting processor.

FIG. 5 shows a second example of the user interface screen created by the setting processor 17. For the setting of monochrome, color information 52 other than the default value included in the document is displayed on the left-hand section of a setting window 51 on the user interface screen. Displayed on the right of the labels of color information 52 are user entry fields 53, in which the user specifies (for alteration) the attribute of font. Also in this setting window 51, dual-frame fields 54 with labels "list" are keys that are pointed by the user for displaying a menu of shapes that can be selected. When the key is pointed, the menu of shape list is displayed over the setting window 51, allowing the user to select an item of the menu with the pointer cursor 50 by operating the mouse device. The menu of shape list goes off when the user selects an item or points a position outside the menu. The item selected by the user is displayed in the user entry field 53 on the left of the key.

Next, the case of adding the font scheme to the color scheme will be explained. This case is similar to the switching from the color scheme to the font scheme explained previously, and is different in that a field for specifying as to whether or not the color of the key-marker is to become the default value is added by the setting processor 17.

Figure 6:
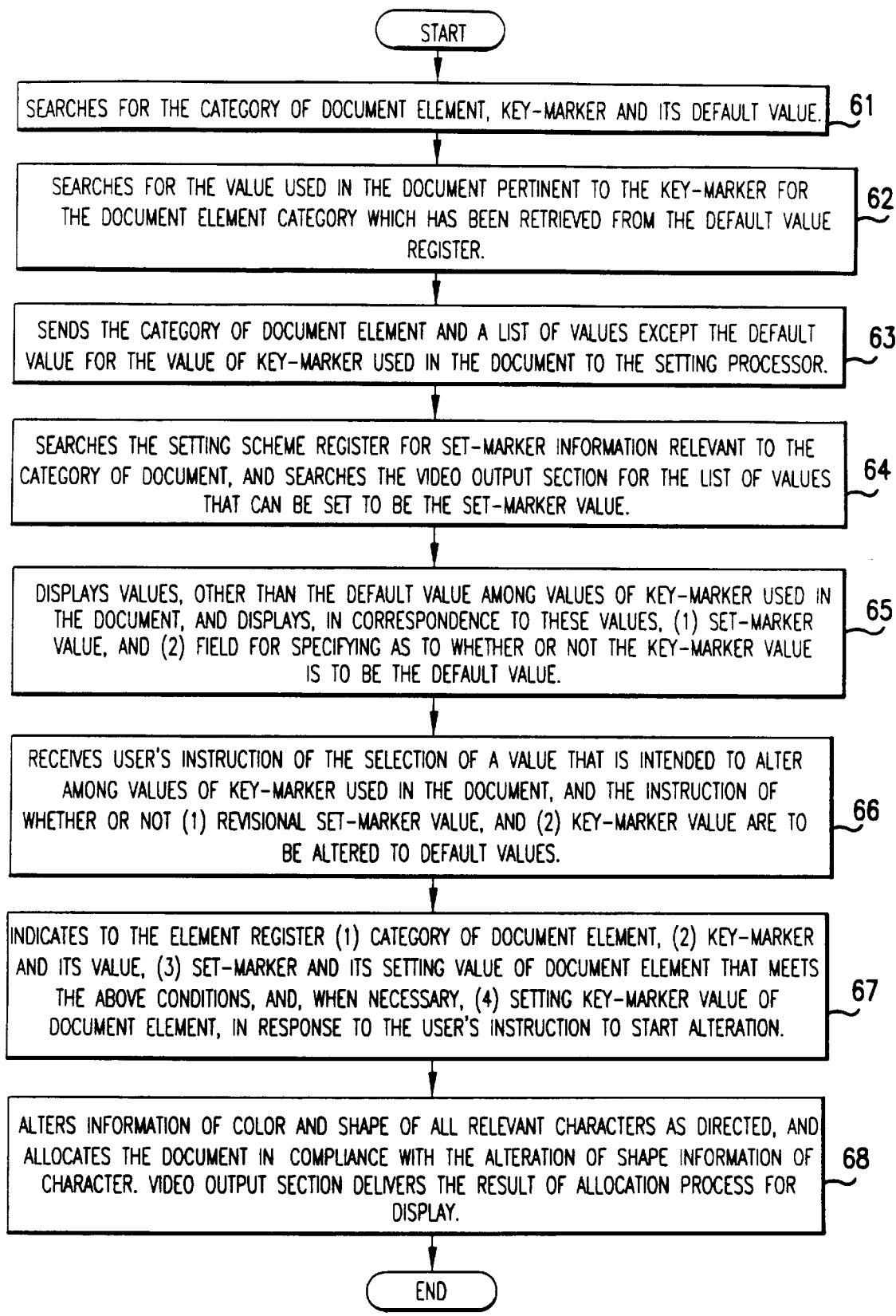
FIG. 6 is a flowchart showing the overall process for the alteration of the emphasizing scheme.

Next, the process of emphasis scheme alteration based on the first embodiment will be explained. FIG. 6 shows by flowchart the overall process of the emphasis scheme alteration. The process starts when the user instructs the alteration of emphasizing scheme by, for example, selecting "emphasis scheme alteration" in the menu of document editor during the document writing. The first step 61 of the process of the search processor 15 searches the default value register 16 for the category of document element, key-marker and its default value. The next step 62 of the process of the search processor 15 searches the element register 12 for the value used in the document pertinent to the key-marker for the document element category which has been retrieved from the default value register 16.

The next step 63 transfers, from the search processor 15 to the setting processor 17, the category of document element and a list of value except the default value for the value of key-marker used in the document. In the next step 64, the setting processor 17 searches the setting scheme register 18 for set-marker information relevant to the category of document, and searches the video output section 14 for the list of values that can be set to be a set-marker value.

In the next step 65, the setting processor 17 displays values other than the default value among values of key-marker used in the document. It further displays, in correspondence to these values, (1) the set-marker value, and (2) a field for letting the user specify as to whether or not the key-marker value is to be a default value (see FIG. 4 and FIG. 5).

In the next step 66 of the process of the setting processor 17, the user selects a value that is intended to alter among values of key-marker used in the document, and it receives the user's instruction of whether or not (1) the revisional set-marker value, and (2) the key-marker value are to be altered to the default values. In the case of the user's instruction of altering the key-marker value to the default value, the setting processor 17 searches the default value register 16 for the key-marker and its default value corresponding to the category of document element.

In the next step 67, when the user instructs the commencement of alteration, the setting processor 17 indicates to the element register 12 (1) the category of document element, (2) the key-marker and its value, (3) the set-marker and its setting value of a document element that meets the above conditions (1) and (2), and, when necessary, (4) the setting key-marker value of a document element that meets the above conditions (1) and (2).

The next step 68 alters the information of color and shape of all relevant characters in the element register 12 as directed by the setting processor 17. Subsequently, the layout processor 13 lays the document out in compliance with the alteration of shape information of characters in the element register 12, and the video output section 14 delivers the result of layout process for display.

Next, the operation of switching or adding a scheme of emphasis and distinction of the case of dealing with two forms of the font and color based on this embodiment will be explained by taking a specific example of document.

Figure 7:
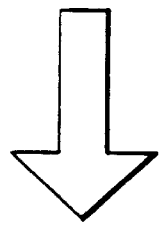
FIG. 7 is a diagram explaining the process of adding the color scheme to the font scheme for the emphasizing scheme.
Figure 8:
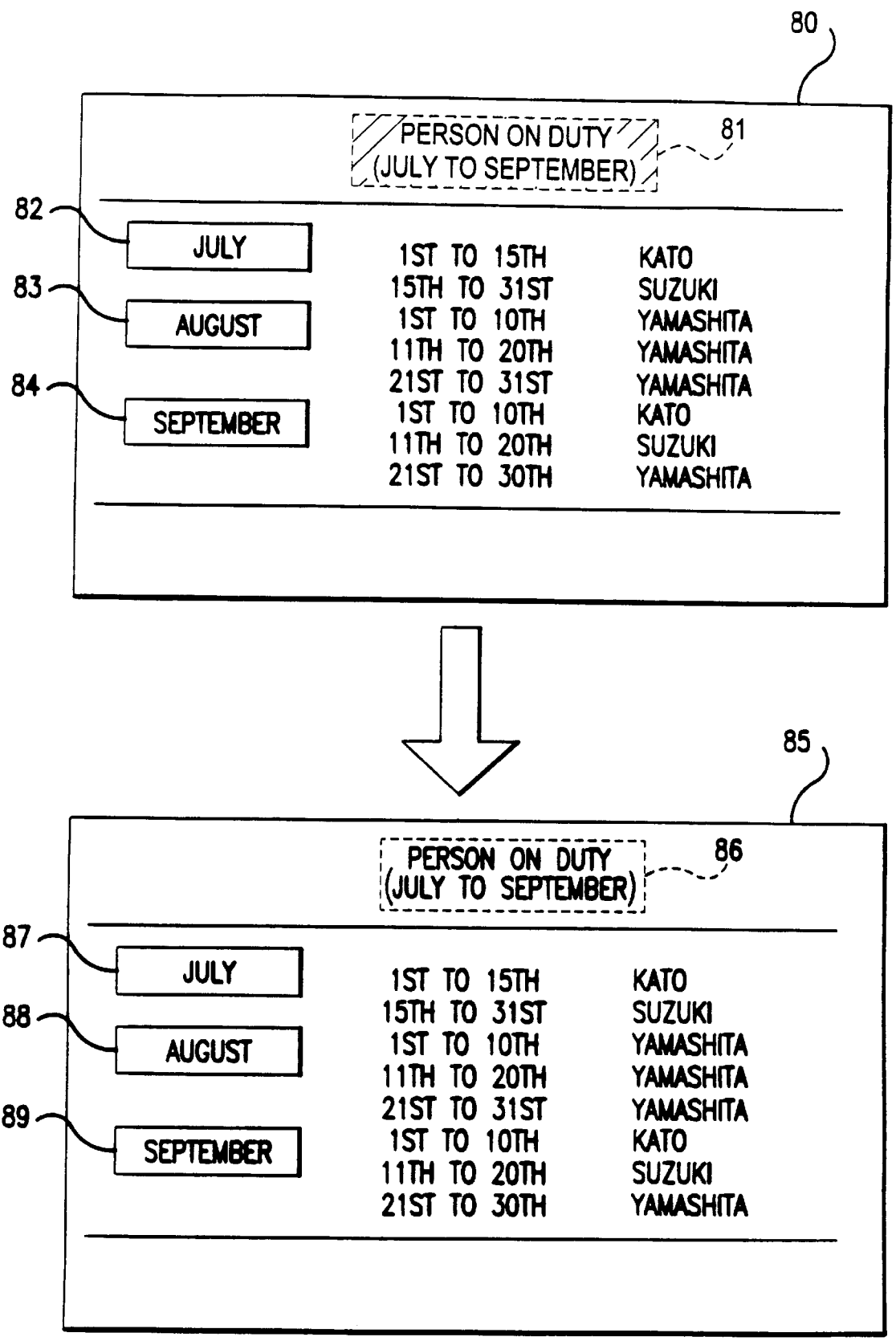
FIG. 8 is a diagram explaining the process of switching the emphasizing scheme from the color scheme to the font scheme.

FIG. 7 explains the process of adding the color scheme to the font scheme, and shows the change in document elements. FIG. 8 explains the process of switching the scheme of emphasis and distinction from the color scheme to the font scheme, and shows the change in document elements.

First, the case of adding the color scheme to the font scheme for the scheme of emphasis and distinction will be explained. It is assumed that the key-marker is "font" and its default value is "Mincho-type." The user is editing a document 70 shown in the upper section of FIG. 7, which includes letters of Gothic-type (71–74) in addition to letters of Mincho-type. The user sets values of color R=10, G=10 and B=50 for Gothic letters based on the process of the setting processor 17, and subsequently instructs the alteration of information of document element. The alteration process takes place to put the color of R=10, G=10 and B=50 for all Gothic letters 71–74 in the original document 70, resulting in colored Gothic letters 76–79 in the revised document 75. Colored letters are shown by hatching in the figure.

If the user specifies, at the same time, the Mincho-type of the default font for Gothic letters, the color of R=10, G=10 and B=50 is put to Gothic letters 71–74 having a font of Mincho-type as a result of the alteration process for the information of document element. As shown in the upper section of FIG. 8, the color of R=10, G=10 and B=50 is put to the Gothic letters 81–84 in the original document 80, and the Mincho-type of default value is restored for the letters, as shown in the lower section of the figure. Consequently, the scheme of emphasis and distinction is switched from the font scheme to the color scheme. Colored letters are shown by hatching also in this figure.

Next, the case of switching the scheme of emphasis and distinction from the color scheme to the font scheme will be explained. The key-marker is "color" and its default value is R=0, G=0 and B=0 also in this example.

The user is editing a document 80 of Mincho-type letters, which include letters 81–84 having a color other than the default color, as shown in the upper section of FIG. 8. The user instructs the conversion of these colored letters 81–84 to have a font of Gothic-type, and the letters become Gothic-type letters 86–89 in the revised document as shown in the lower section of FIG. 8. Consequently, all letters having a color other than the default color become Gothic-type and have the default color.

According to the document processing system of the first embodiment, in which the font and color of letters are used to switch or combine schemes of emphasis and distinction, it becomes possible to (1) clarify the emphasis and distinction of letters having a font different from the default font by using the multicolor expression on a color output device, (2) clarify the emphasis and distinction of letters having a color different from the default color by changing the font on a color output device, and (3) clarify the emphasis and distinction of letters having a color different from the default color by changing the font and changing the color to the default color on a monochrome output device.

Next, variant embodiments of the system components used in the document processing system of the first embodiment will be explained.

(1) Format of document elements held by the element register 12

In the first embodiment, the element register 12 holds document elements by expressing characters of document elements in terms of the character code, shape and color as sets of attribute and value, and arranging the sets in the order of appearance in the document to form a string of information. As an alternative manner, a table of attributes used in a document may be placed at the top of the document, with a temporary identifier being given to each attribute value, so that the identifier is used for the attribute value in the document. For example, when a document uses a color of R=0, G=0 and B=50 and another color of R=70, G=70 and B=70, these colors are given identifiers "color1" and "color2," and a document element in the document is expressed as:

{(category character), (code 1111), (font Mincho), (size 10-point), (color color1)}.

(2) Format of document element color information held by the element register 12 and default value register 16

In the first embodiment, RGB values are held as color information of document elements. As an alternative manner, other format that meets the printing form of the video output section 14, e.g., YMCK values, may be employed in place of the RGB values. This scheme can readily be practiced by the provision of a color code converting processor.

(3) Format of character shape information held by the element register 12

The register of the first embodiment holds the font and size as information of the shape of character. In addition to these items, information on the character ornamentation (e.g., underlining) and character-background ornamentation (e.g., color inversion between foreground and background) may be held so that the scheme of emphasis and distinction is reinforced.

(4) Key-marker used to specify characters to be emphasized

Instead of using the font of character as a key-marker, other item such as the character size (point number), character ornamentation (underline, Bold-type letters, etc.) or character-background ornamentation (inversion of foreground and background) may be used. Furthermore, multiple sets of key-markers and their default values may be registered.

(5) Default values specified by the user with the setting processor 17

The setting processor 17 may hold a table of default values of original key-marker values and revisional set-marker values and key-marker values (selection as to whether or not key-markers are to be default values) and display it so that the user specifies portions to be altered. This modification reduces the user's task and enables the efficient setting process.

(6) Color designation for the setting processor 17

Instead of using color patches pointed by the user for specifying a color for the setting processor 17 in the document processing system of the first embodiment, the color may be specified numerically in terms of the YMCK value or RGB value that are the general convention of color designation.

[EMBODIMENT 2]

It is possible to automate the user's routine action for instructing the correspondence between the original key-marker value and the revisional set-marker value and key-marker value conducted with the setting processor 17 in the case of the first embodiment. The document processing system of the second embodiment is intended for this implementation.

Figure 9:
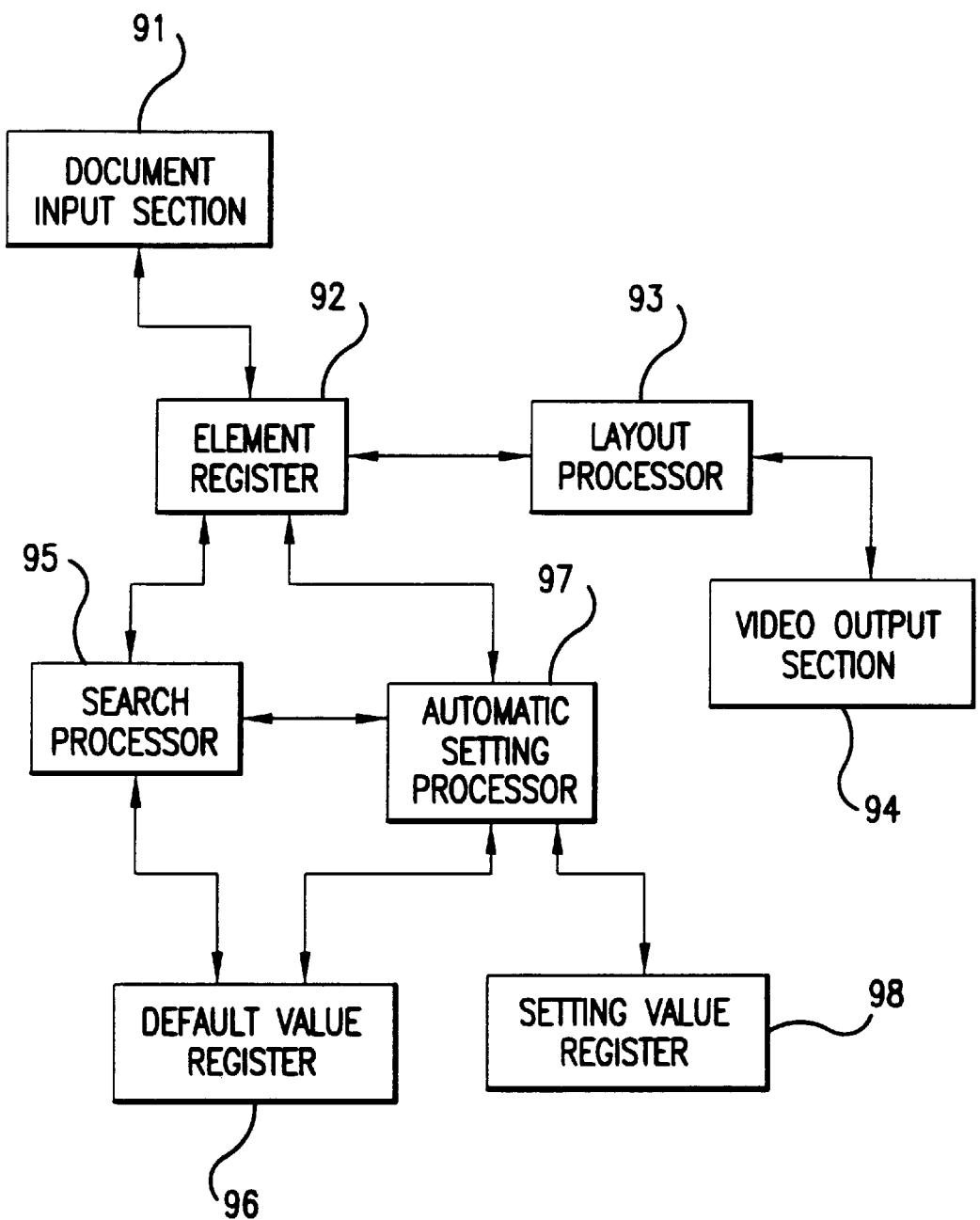
FIG. 9 is a block diagram of the document processing system based on the second embodiment of this invention.

FIG. 9 shows by block diagram the configuration of the major system components of the document processing system of this embodiment. The system includes a document input section 91, a element register 92, a layout processor 93, a video output section 94, a search processor 95, a default value register 96, an automatic setting processor 97, and a setting value register 98.

The document input section 91, element register 92, layout processor 93, video output section 94, search processor 95 and default value register 96 of the document processing system of this embodiment shown in FIG. 9 are correspondent and similar in structure and operation to the document input section 11, element register 12, layout processor 13, video output section 14, search processor 15 and default value register 16 of the document processing system of the first embodiment shown in FIG. 1. The setting processor 17 and setting scheme register 18 of the first embodiment are replaced with the automatic setting processor 97 and setting value register 98 in the second embodiment. The setting value register 98 holds an automatic setting table which contains sets of categories of document elements, original key-marker information, and revisional set-marker information.

FIG. 10 shows an example of the automatic setting table. The automatic setting table 100 stores categories of document elements, original key-marker information, revisional set-marker information and revisional key-marker values in correspondent manner. Namely, for storing these information correspondingly, the automatic setting table 100 has a document element category field 101, an original key-marker information field 102, a revisional set-marker information field 103 and a revisional key-marker value field 104.

Specifically, the element category field 101 contains a category of document element (e.g., character), the original key-marker information field 102 contains an original key-marker (attribute) and its value, the revisional set-marker information field 103 contains a revisional set-marker (attribute) and its value, and the revisional key-marker value field 104 contains a value ("default value" or "intact") as revisional key-marker information indicative of as to whether or not the key-marker value is to be the default value after the alternation.

For example, when it is intended to change the color of Gothic letters in a document for the purpose of emphasis or distinction, the user enters "character" for the category of document element in the document element category field 101, enters "font" and "Gothic-type" for the key-marker and its value in the original key-marker information field 102, enters "color" and "0, 0, 80" indicative of blue in RGB code for the set-marker and its value in the revisional set-marker information field 103, and enters "default value" indicative of the designation of the key-marker value after the alteration to the default value in the revisional key-marker value field 104.

Figure 11:
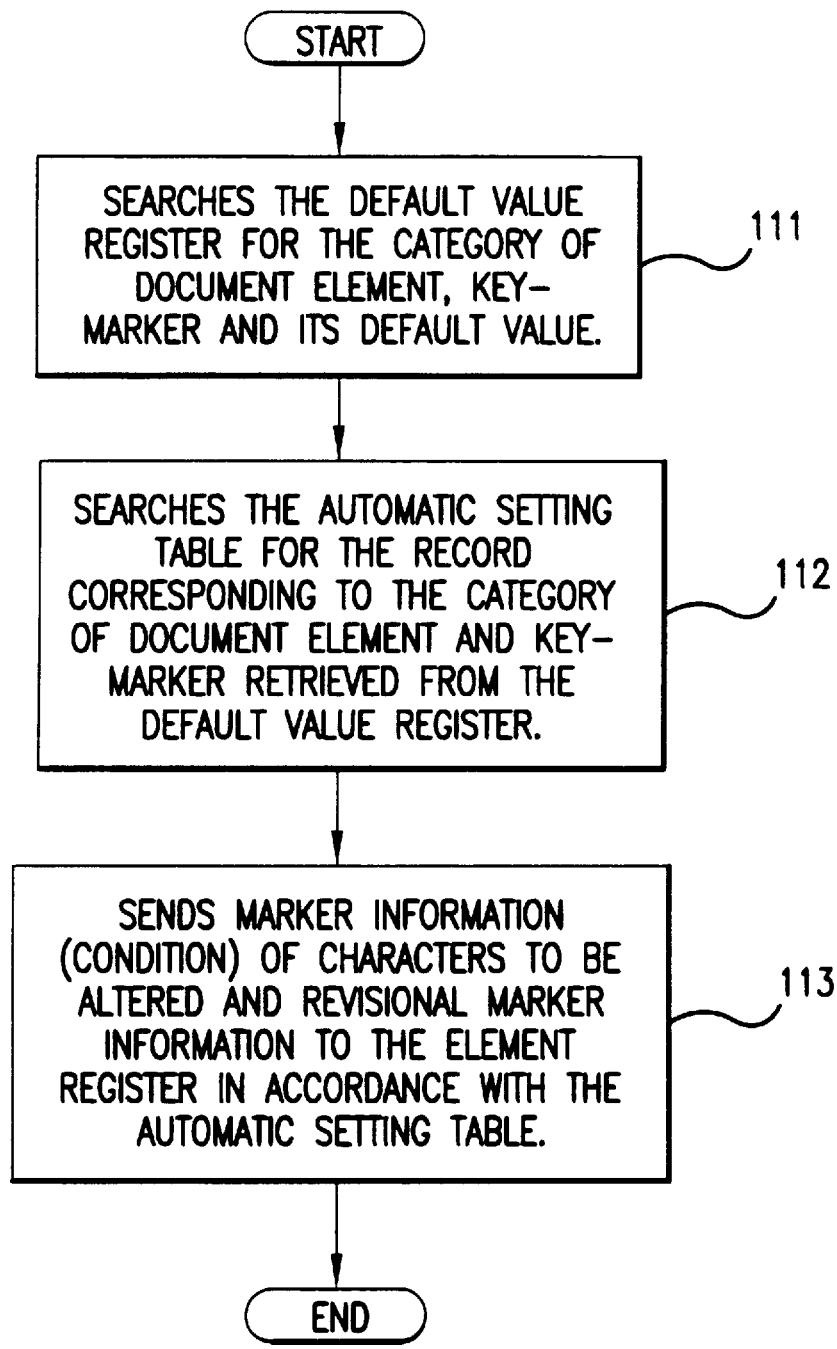
FIG. 11 is a flowchart showing the process of the automatic setting processor which uses the automatic setting table.

FIG. 11 shows by flowchart the process of the automatic setting processor 97 which uses the automatic setting table. The first step 111 searches the default value register 96 for the category of document element, key-marker and its default value in response to the user's instruction. The next step 112 makes reference to the automatic setting table 100 stored in the setting value register 98 to search for the record corresponding to the category of document element and key-marker retrieved from the default value register 96. The last step 113; sends the marker information (condition) of characters to be altered and revisional marker information to the element register in accordance with the automatic setting table.

Specifically, the scheme of emphasis and distinction is altered by issuing a command of altering the set-marker value to the value indicated by the automatic setting table for document elements having a certain value of key-marker. This command is not issued to the element register 92 if the key-marker value is the default value. In case the automatic setting table has a setting for making the key-marker value to be the default value, a command of making it to be the default value is issued besides the alteration of the set-marker value.

Next, a specific example of information held by each system component of the document processing system of this embodiment for the case of adding or switching the scheme of emphasis and distinction of two markers of "font" and "color" for characters of document elements will be explained.

(1) In the case of switching from the font scheme to the color scheme, the default value register 96 holds information "character" as a category of document element and holds information "font" as a key-marker. It holds information "Mincho-type," for example, as a default value. In the setting value register 98, entries (a row) having the setting of "character" in the document element category field 101, "font" in the original key-marker information field 102, and "default value" in the revisional key-marker value field 104 are created in the automatic setting table 100.

(2) In the case of switching from the color scheme to the font scheme, the default value register 96 holds information "character" as a category of document element and holds information "color" as a key-marker. It holds a set of values R=0, G=0 and B=0, for example, as a default value. In the setting value register 98, entries (a row) having the setting of "character" in the document element category field 101, "color" in the original key-marker information field 102, and "default value" in the revisional key-marker value field 104 are created in the automatic setting table 100.

(3) In the case of adding the color scheme to the font scheme, the default value register 96 holds information "character" as a category of document element and holds information "font" as a key-marker. It holds "Mincho-type," for example, as a default value. In the setting value register 98, entries (a row) having the setting of "character" in the document element category field 101, "font" in the original key-marker information field 102, and "intact" in the revisional key-marker value field 104 are created in the automatic setting table 100.

(4) In the case of adding the font scheme to the color scheme, the default value register 96 holds information "character" as a category of document element and holds information "color" as a key-marker. It holds a set of values R=0, G=0 and B=0, for example, as a default value. In the setting value register 98, entries (a row) having the setting of "character" in the document element category field 101, "color" in the original key-marker information field 102, and "intact" in the revisional key-marker value field 104 are created in the automatic setting table 100.

Initial data are set in the system components depending on the emphasizing scheme intended by the user as explained above, and the process of emphasis scheme alteration is carried out.

Figure 12:
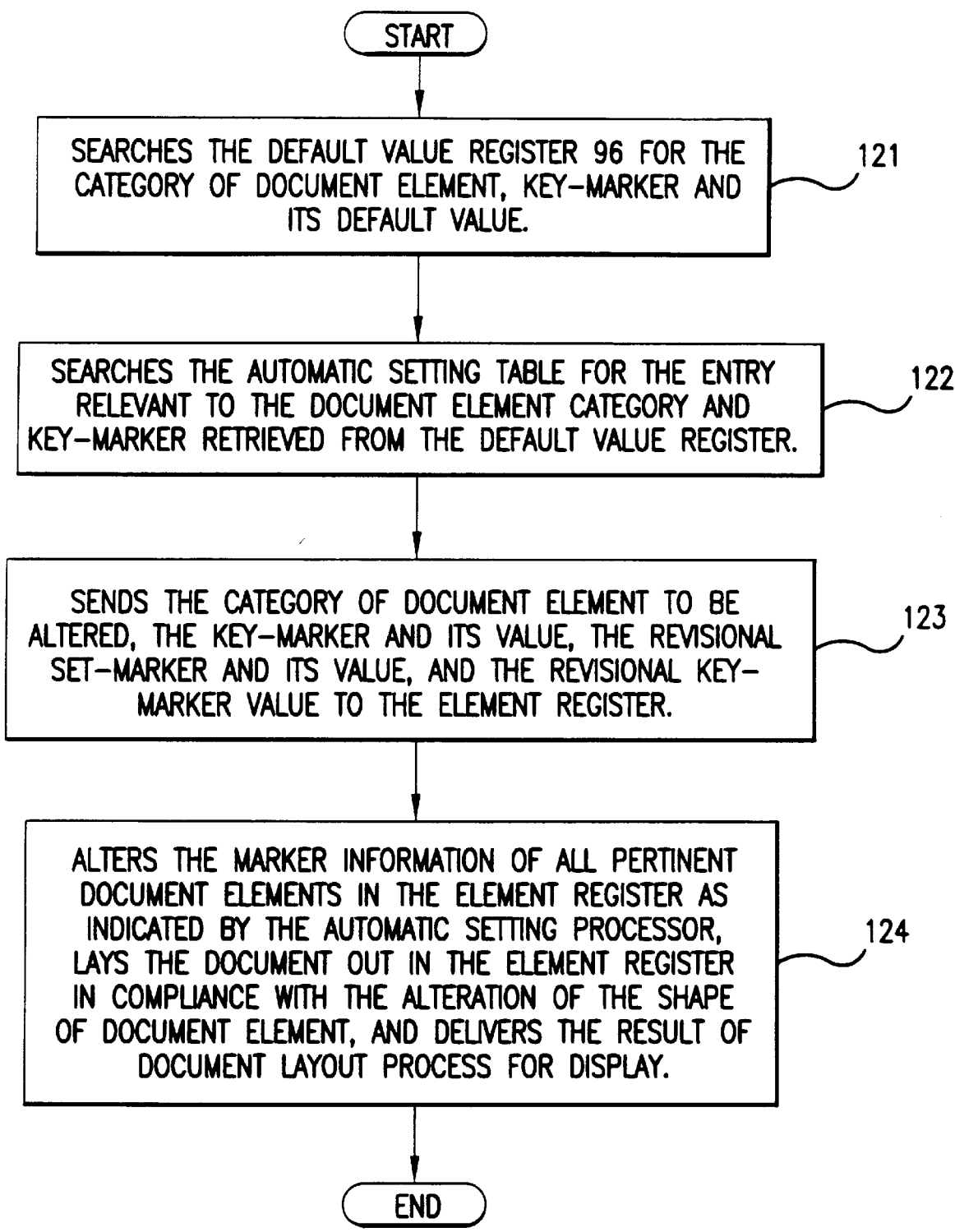
FIG. 12 is a flowchart showing the process of altering the emphasizing scheme by the document processing system of the second embodiment.

FIG. 12 shows by flowchart the process of emphasis scheme alteration implemented by the document processing system of the second embodiment. The program of emphasis scheme altering process starts when the user instructs the alteration of emphasizing scheme by selecting the "emphasizing scheme alteration" in the menu of document editor, for example, during the document writing.

The first step 121 of process of the automatic setting processor 97 searches the default value register 96 for the category of document element, key-marker and its default value. The next step 122 of the process of the automatic setting processor 97 searches the automatic setting table stored in the setting value register 98 for the entry relevant to the document element category and key-marker retrieved from the default value register 96. The next step 123 of the process of the automatic setting processor 97 sends the category of document element to be altered, the key-marker and its value, the revisional set-marker and its value, and, when necessary, the revisional key-marker value to the element register 92.

The last step 124 alters the marker information of all pertinent document elements in the element register 92 as indicated by the automatic setting processor 97. The layout processor 93 lays the document out in the element register 92 in compliance with the alteration of the shape of document element, and the video output section 94 delivers the result of document layout process for display.

Next, a specific example of the foregoing emphasis scheme altering process will be explained. It is assumed that the initial data held by the default value register 96 has values of "character" for the category of document element, "font" for the key-marker and "Mincho-type" for the default value of key-marker. The document which is being edited includes Gothic-type letters and Bold-type letters besides Mincho-type letters.

The automatic setting processor 97 is assumed to hold the record in the automatic setting table 100 as shown in FIG. 10. By the process of emphasis scheme alteration based on the data in the entries of row 1 of the automatic setting table 100, the color of R=0, G=0 and B=80 is set to all Gothic-type letters among characters in the document and Mincho-type as the default value is set to the font of these letters. By the process based on the data in the entries of row 2 of the automatic setting table 100, the color of R=10, G=10 and B=70 is set to all Bold-type letters in the document, but the font for the key-marker is left unchanged.

Although in the document processing system of the second embodiment, the setting value register 98 holds color information in terms of the RGB code ranging from 0 to 100, other form of information such as the YMCK code may be applied. The original key-marker information held by the setting value register 98 may be multiple sets of key-markers and their values.

[EMBODIMENT 3]

In contrast to the first embodiment in which the user can specify a value of set-marker inclusive of the default value, it is possible to confine the range of user's selection of set-marker value to only values other than the default value so that the user's erroneous selection of default value is prevented. The document processing system of the third embodiment is intended for this implementation.

Figure 13:
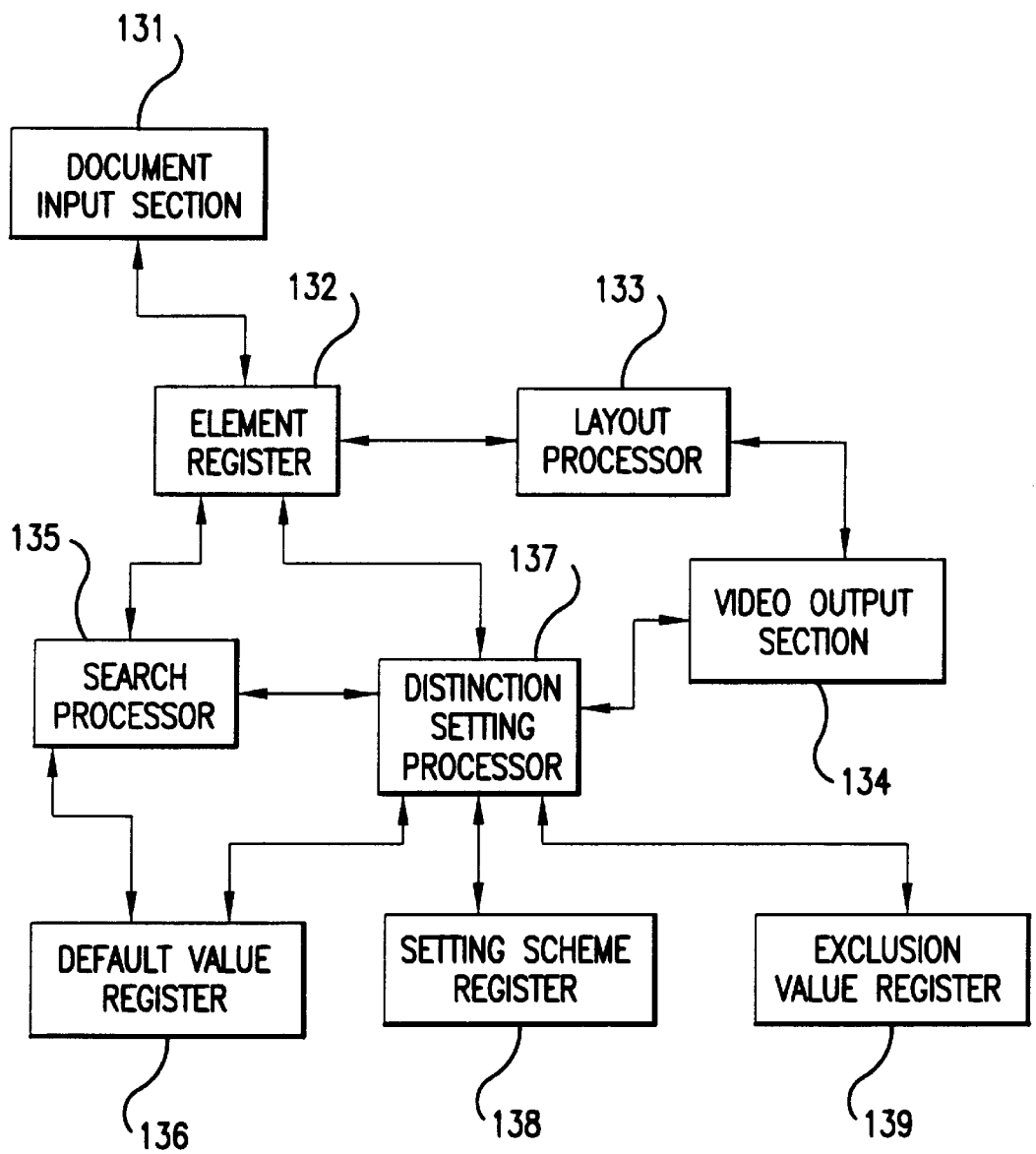
FIG. 13 is a block diagram of the document processing system based on the third embodiment of this invention.

FIG. 13 shows the configuration of the major system components of the document processing system based on the third embodiment of invention. The system includes a document input section 131, an element register 132, a layout processor 133, a video output section 134, a search processor 135, a default value register 136, a distinction setting processor 137, a setting scheme register 138, and an exclusion value register 139.

The document input section 131, element register 132, layout processor 133, video output section 134, search processor 135 default value register 136 and setting scheme register 138 of the document processing system of this embodiment shown in FIG. 13 are correspondent and similar to the document input section 11, element register 12, layout processor 13, video output section 14, search processor 15, default value register 16 and setting scheme register 18 of the document processing system of the first embodiment shown in FIG. 1.

The document processing system of the third embodiment is virtually identical in structure and operation to the document processing system of the first embodiment, except that the setting processor 17 of the first embodiment is replaced with the distinction setting processor 137 and the exclusion value register 139 associated with it is added. The distinction setting processor 137 is virtually the same processing function as the setting processor 17 of the first embodiment.

Figure 14:
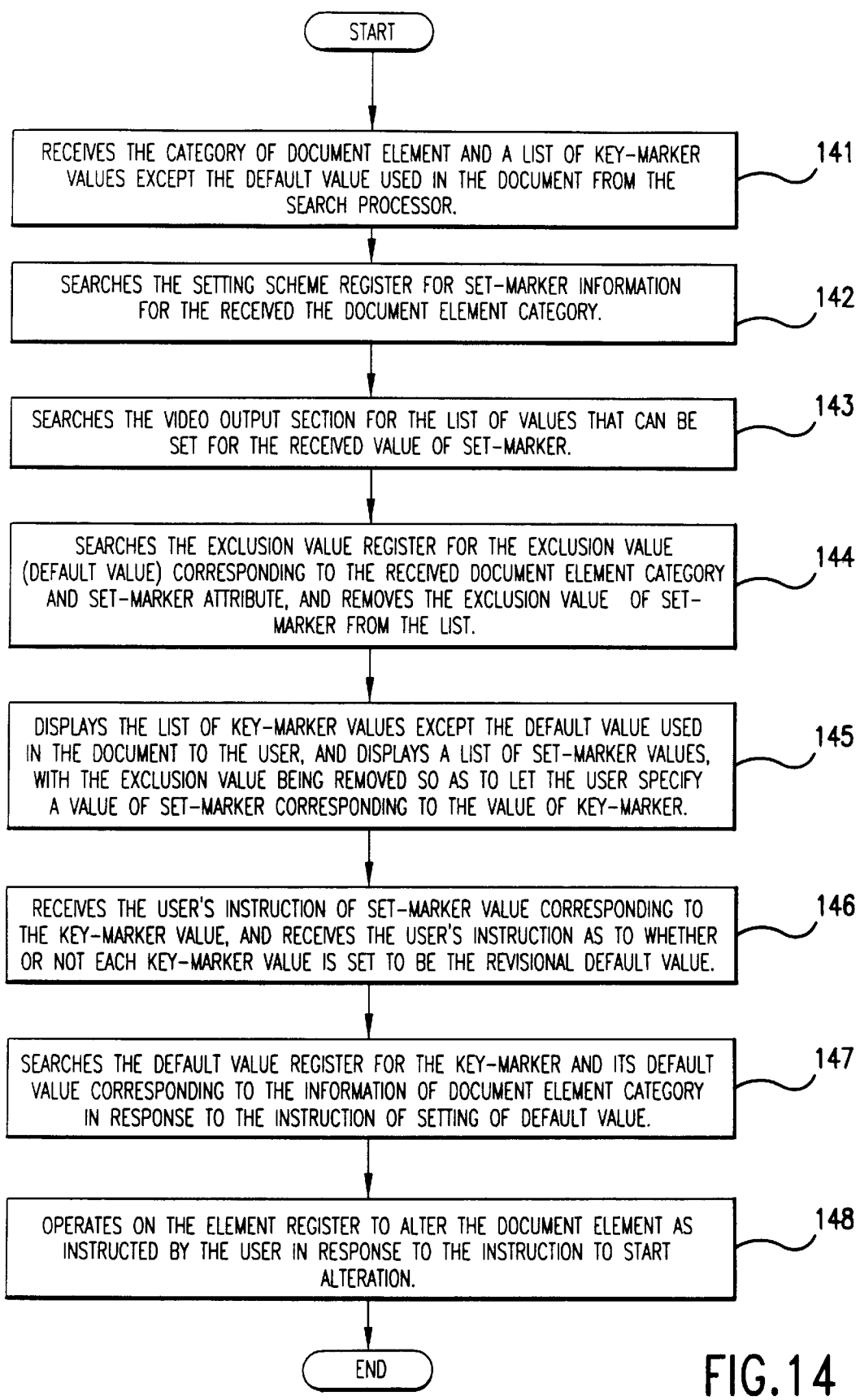
FIG. 14 is a flowchart explaining the process of the distinction setting processor.

FIG. 14 shows by flowchart the process of the distinction setting processor 137. The first step 141 receives from the search processor 135 the category of document element and a list of key-marker values except the default value used in the document. The next step 142 searches the setting scheme register 138 for set-marker information for the document element category received in the preceding step 141.

The next step 143 searches the video output section 134 for the list of values that can be set for the value of set-marker received in the preceding step 142. The next step 144 searches the exclusion value register 139 for the exclusion value (default value) corresponding to the document element category and set-marker attribute received in the preceding step 142, and removes the exclusion value of set-marker from the list.

The next step 145 displays the list received in the preceding step 141 for the user. It displays a list of set-marker values, with the exclusion value being removed by the process of the preceding step 144, so as to let the user specify a value of set-marker corresponding to the value of key-marker.

The next step 146 receives the user's instruction of set-marker value corresponding to the key-marker value. It also receives the user's instruction as to whether or not each key-marker value is set to be a revisional default value.

In response to the user's instruction for setting the key-marker value to be the default value, the next step 147 searches the default value register 136 for the key-marker and its default value corresponding to the information of document element category received in the preceding step 141. In response to the user's instruction to start alteration, step 148 operates on the element register 132 to alter the document element as instructed by the user in the preceding step 146.

Specifically, it indicates, for characters having relevant value of key-marker, the alteration of the value of set-marker to the value instructed by the user. In case the user has instructed to make the key-marker value to be the default value, it indicates the designation of the key-marker value to be the default value, besides the alteration of the value of set-marker.

The user interface screens used in the process of the distinction setting processor 137 of this embodiment are virtually identical to those shown in FIG. 4 and FIG. 5 used for the color setting in the process of the setting processor 17 of the first embodiment, except that the lists of color patch and character shape do not include default values. In the case of entering color information numerically in terms of the YMCK code or RGB code, the default value is absent and cannot be selected. The exclusion value register 139 holds sets of values of attributes that are conceived to be default values in the document.

Figure 15:
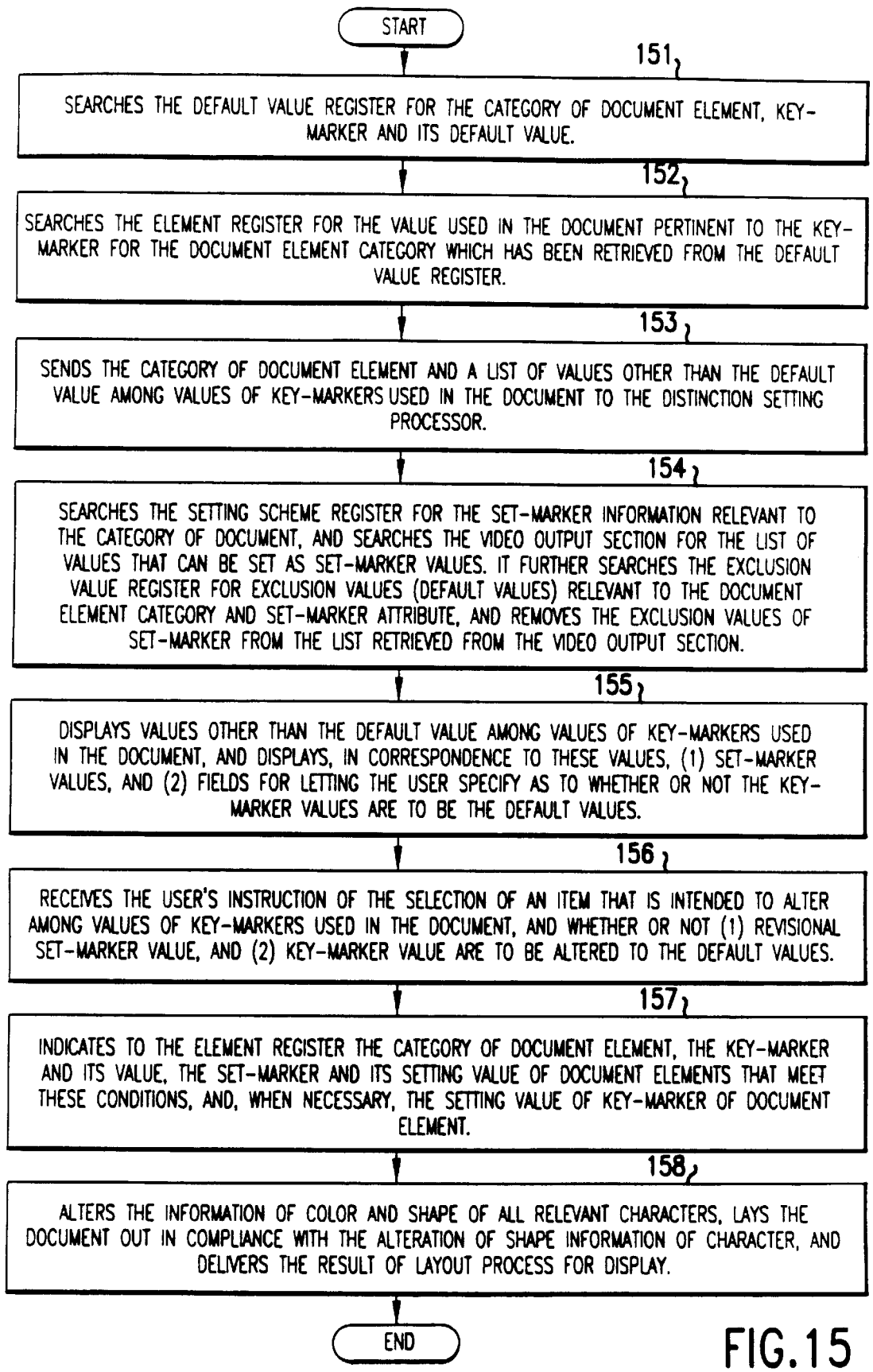
FIG. 15 is a flowchart showing the overall process of altering the emphasizing scheme based on a third embodiment of this invention.

Next, the process of emphasis scheme alteration based on the third embodiment will be explained. FIG. 15 shows by flowchart the overall process of emphasis scheme alteration. The process starts when the user instructs the alteration of emphasizing scheme by, for example, selecting "emphasis scheme alteration" in the menu of document editor during the document writing. The first step 151 of the process of the search processor 135 searches the default value register 136 for the category of document element, key-marker and its default value. The next step 152 of the process of the search processor 135 searches the element register 132 for the value used in the document pertinent to the key-marker for the document element category which has been retrieved from the default value register 136.

The next step 153 transfers, from the search processor 135 to the distinction setting processor 137, the category of document element and a list of values other than the default value among values of key-markers used in the document. In the subsequent step 154, the distinction setting processor 137 searches the setting scheme register 138 for the set-marker information relevant to the category of document, and searches the video output section 134 for the list of values that can be set as set-marker values. It further searches the exclusion value register 139 for exclusion values (default values) relevant to the document element category and set-marker attribute, and removes the exclusion values of set-marker from the list retrieved from the video output section 134.

In the next step 155, the distinction setting processor 137 displays values other than the default value among values of key-markers used in the document. It further displays, in correspondence to these values, (1) the set-marker values, and (2) fields for letting the user specify as to whether or not the key-marker values are to be the default values (see FIG. 4 and FIG. 5). In the next step 156 of the process of the distinction setting processor 137, the user selects a value that is intended to alter among values of key-markers used in the document, and instructs whether or not (1) the revisional set-marker value, and (2) the key-marker value are to be altered to the default values. In the case of the user's instruction of altering the key-marker value to the default value, the distinction setting processor 137 searches the default value register 136 for the key-marker and its default value corresponding to the category of document element.

In the next step 157, when the user instructs the start of alteration, the distinction setting processor 137 indicates to the element register 132 (1) the category of document element, (2) the key-marker and its value, (3) the set-marker and its setting value of document elements that meet the above conditions (1) and (2), and, when necessary, (4) the setting key-marker value of document elements that meets the above conditions (1) and (2).

The next step 158 alters the information of color and shape of all relevant characters in the element register 132 as directed by the distinction setting processor 137. Subsequently, the layout processor 133 lays the document out in compliance with the alteration of shape information of characters in the element register 132, and the video output section 134 delivers the result of layout process for display.

[EMBODIMENT 4]

The alteration of the scheme of emphasis and distinction for document elements in a document based on the visual feature of characters according to the first, second and third embodiments can be extended to the alteration of the scheme of emphasis and distinction for document elements in a document based on the visual feature of lines of figures and tables as the fourth embodiment of this invention.

The document processing system of the fourth embodiment is partially modified to meet the different data form. The following explains the functions, which deal with the visual features of lines, added to the element register 12 (92, 132) and layout processor 13 (93, 133) of the first (second and third) embodiment.

The element register 12 (92, 132) expresses a line in terms of a set of attributes and their values as follows:

{(category line), (thickness 1), (dashed-line solid-line), (right-end corner), (left-end corner), (color R=0, G=0, B=50)}.

The layout processor 13 (93, 133) determines the position of an area which forms a line based on the following first information through third information, as in the case of the layout of a character string.

First information: Pertains to the shape, such as the thickness, of a line to be displayed, and is held in the element register 12 (92, 132).

Second information: Pertains to the shape, such as the size, of the line to be displayed, and is held in the video output section 14 (94, 134).

Third information: Pertains to the restriction of layout of the line on a page in connection with the margin or the like, and is held by the element register 12 (92, 132).

When information on the shape of line held in the element register 12 (92, 132) is altered, it is necessary to re-execute the document layout process by the layout processor 13 (93, 133).

Next, the operation of the document processing system of the fourth embodiment will be explained by taking an example of the switching of the scheme of emphasis and distinction of document elements in a document based on the visual feature of lines of figures and tables from the line-thickness scheme to the color scheme. It is assumed that the correspondence between the original markers and revisional markers has been instructed by the user in advance, as in the case of the first embodiment.

The default value register 16 (96, 136) holds information "line" as a category of document element, holds information "thickness" as a key-marker, and holds value "1" as a default value of key-marker. The setting scheme register 18 (138) holds information "line" as a category of document element and holds information "color" as a set-marker. The operation for putting "color" to lines other than those with the default set-marker is carried out. The user specifies a color as follows.

Figure 16:
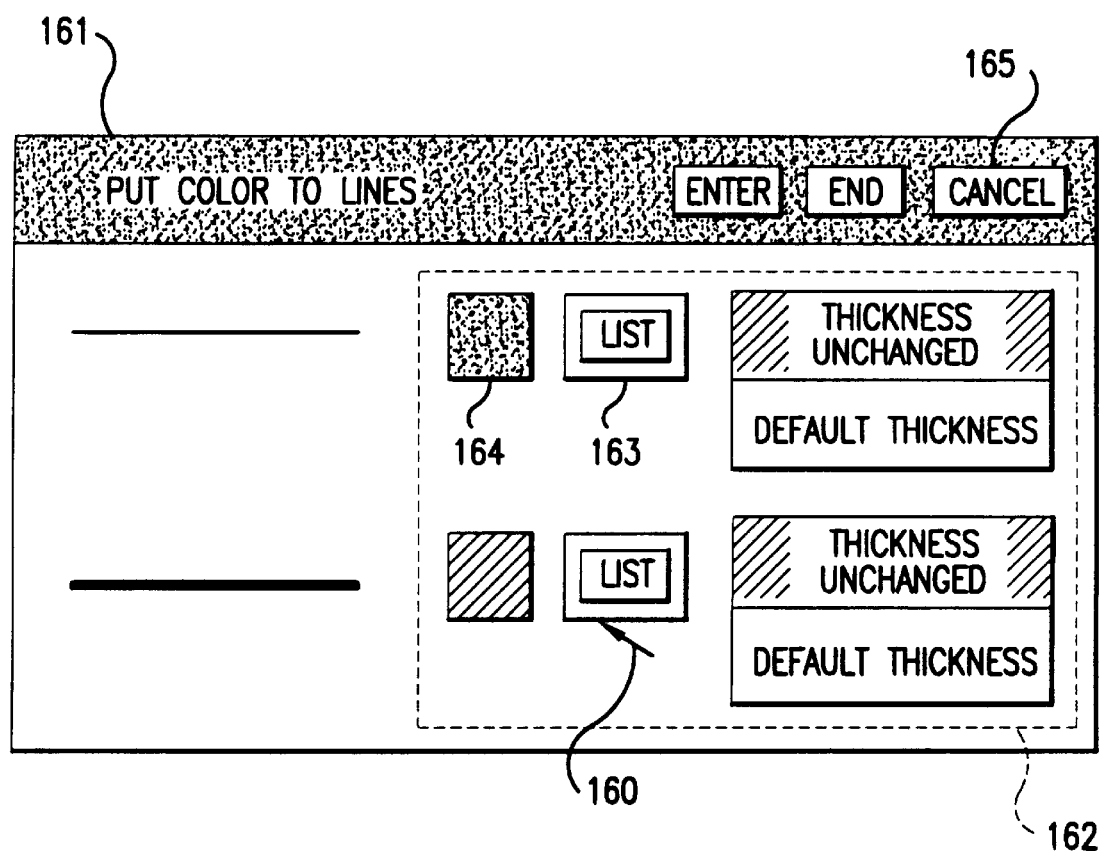
FIG. 16 is a diagram showing an example of the user interface screen created by the setting processor based on the fourth embodiment of this invention.

FIG. 16 shows an example of the user interface screen created by the setting processor 17 of this embodiment. This user interface screen has the same function as that shown in FIG. 4, with only difference being that the user is prompted to specify a thickness of line instead of a font of character.

For the setting of line color, values other than the default value among values of of key-markers included in the document are displayed on the left-hand section of a setting window 161 on the user interface screen. Displayed on the right of the key-marker value is a user entry field 162, in which the user specifies color information to be put to a line with a key-marker other than the default value and specifies as to whether or not the key-marker is to be the default value. Namely, this is the specification of as to whether or not the color putting operation for a line with the default value is to take place. The system is initialized to have no-color (blank) for the color information field (color patch) and the selection of non-default value for the key-marker.

The user specifies the color information by selecting the color patch 164. In FIG. 16, a dual-frame field 163 with labels "list" is a color patch key that is pointed by the user for displaying a list of color patches that can be selected. The list of color patches is displayed over the setting window 161 by the operation of the setting processor 17. When the user operates the mouse device to select with a pointer cursor 160 one of color patches in the list or point a position outside the color patch, the color patch list goes off. The color selected by the user is displayed in the rectangular field of color patch 164 on the left of the color patch key field 163.

FIG. 17 shows the switching of the scheme of emphasis and distinction for lines of figures and tables from the thickness scheme to the color scheme. The switching process will be explained on the assumption that the category of document element is "line," key-marker is "thickness," and default key-marker value is "1." The user is editing a document 170 shown in the upper section of FIG. 17. The document 170 includes lines of two kinds of thickness, i.e., lines 171 with thickness "1" and lines 172 with thickness "2," and all lines are black (R=0, G=0, B=0).

When the user operates on the user interface screen shown in FIG. 17 in interaction with the process of the setting processor 17 to set the color of R=10, G=10 and B=70 for the lines 171 of thickness "2," and subsequently instructs the alteration of document element information, then the color of R=10, G=10 and B=70 is put to the lines 171 of thickness "2" among the lines 171 and 172 in the document 170, resulting in lines 174 having the color of R=10, G=10 and B=70 and the thickness of default value "1" in the revised document 173 as shown in the lower section of FIG. 17, in which the colored lines are shown as dashed lines. Consequently, the scheme of emphasis and distinction for lines is switched from the thickness scheme to the color scheme for the thicker lines 171. Other lines 172 in the document 170 having a thickness of default value "1" are left unchanged for their color and thickness as shown by 175 in the altered document 175. Characters are not altered for their color and shape.

Although the fourth embodiment has been explained only for the case of switching the scheme of emphasis and distinction for lines of figures and tables from the line-thickness scheme to the color scheme, it is also possible to switch to other scheme or combine the schemes of emphasis and distinction. For example, it is possible to add the color scheme to the line-thickness scheme, or switch the color scheme to the line-thickness scheme. It is also possible to register the correspondence between original marker information and revisional marker information so that the scheme of emphasis and distinction is altered without the user's instruction, as in the case of the second embodiment.

[EMBODIMENT 5]

Switching of the scheme of emphasis and distinction for lines explained in the preceding fourth embodiment can be applied to a digital color copy machine which deals with images in terms of pixel data. The digital color copy machine, with the function of putting multiple colors to lines with thicknesses different from a default value, being added so as to provide more clear emphasis and distinction will be explained as the fifth embodiment. Although the copy machine of this embodiment deals with images and processes pixel data, the terms "key-marker" and "set-marker" are used in the same sense as the preceding first through fourth embodiments. Specifically, the key-marker is the thickness of line and the set-marker is the color of line in this embodiment.

Figure 18:
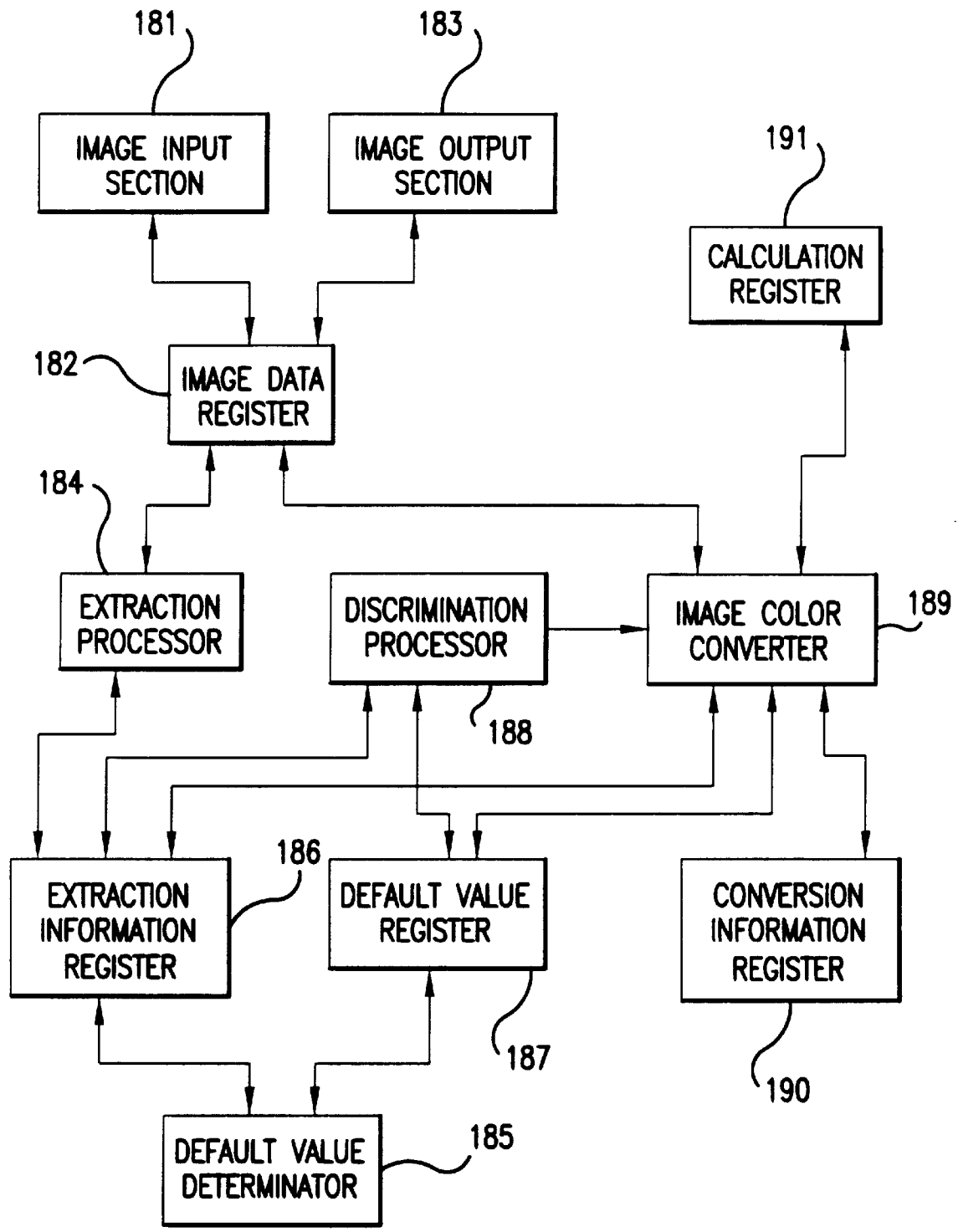
FIG. 18 is a block diagram of the document processing system (digital color copy machine) based on the fifth embodiment of this invention.

FIG. 18 shows by block diagram the configuration of the major system components of the document processing system (digital color copy machine) based on the fifth embodiment of invention. The system includes an image input section 181, an image data register 182, an image output section 183, an extraction processor 184, a default value determinator 185, an extraction information register 186, a default value register 187, a discrimination processor 188, an image color converter 189, a conversion information register 190, and a calculation register 191.

Among these system components, the image input section 181, image data register 182 and image output section 183 are identical to those of conventional digital copy machines, and explanation thereof is omitted.

The image input section 181 reads the image of a source document and produces digital image data. Specifically, it scans a monochrome document optically to produce image data, separates the data into color data of red (R), green (G) and blue (B), and produce digital color image data of 256 gray levels (8 bits for each color). The image data register 182 holds the digital color image data.

Figure 19:
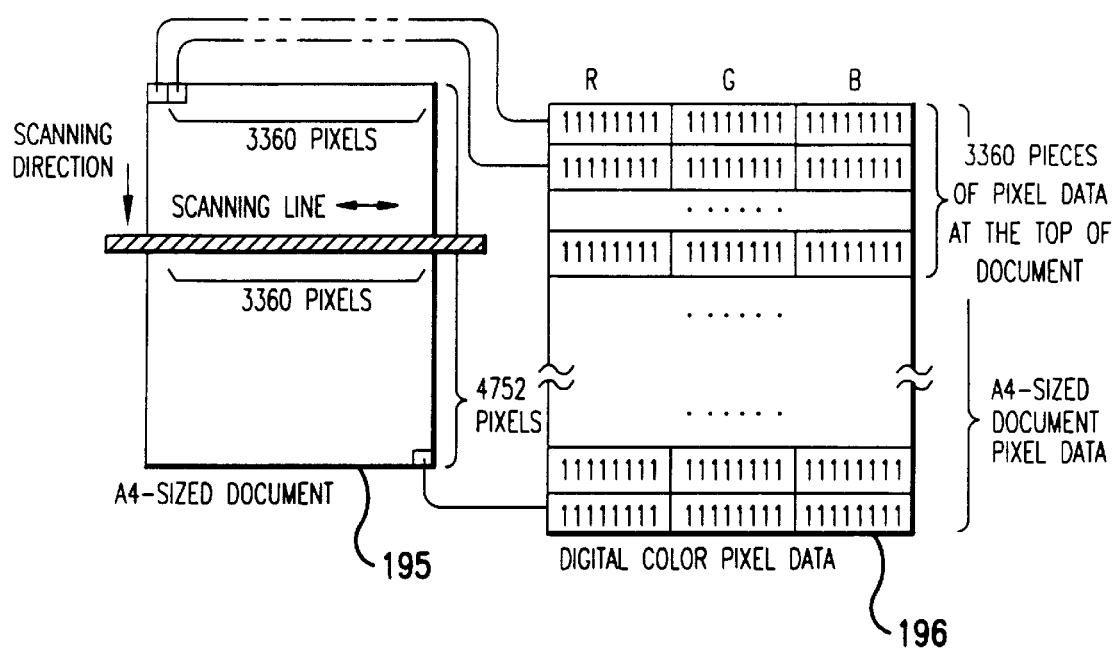
FIG. 19 is a diagram explaining the relation between the source document reading by the image input section and pixel data.

FIG. 19 explains the relation between the source document reading and pixel data in the process of the image input section 181. The digital color image data 196 produced by the image input section 181 consists of pixels each having an area of 0.0625-by-0.0625 mm (or 16-by-16 pixels in 1 mm$^2$, or a resolution of about 400 dpi) on the source document. A pixel is represented by 24 bits (contiguous 3-byte data), with the first 8 bits being assigned to 256-tone data for red, the next 8 bits being assigned to 256-tone data for green and the last 8 bits being assigned to 256-tone data for blue. All-"1" bit data signifies white, and all-"0" bit data signifies black.

One scanning operation produces digital color image data of one A4-sized page of document, and the image data consists of contiguous 3360-by-4752 pixel data (3360 pixels in the horizontal main scanning direction and 4752 pixels in the vertical subordinate scanning direction). Scanning of pixel data starts at the top-left corner of the source document, and complies with the convention of optical scanning in which the CCD-based scanning line along the short-side direction of the document is moved in the long-side direction. In the case of an A4-sized document placed by being directed vertically, the first through 3360th pixel data are derived from pixels aligning from left to right at the top of the document, and 4752 sets of 3360 pieces of pixel data are produced in the order from top to bottom on the document.

The image data register 182 holds the entered digital color image data in this data structure (based on the address of the order of scanning line data).

The image output section 183 operates with a printing mechanism which is based on the digital color xerography to implement laser beam exposure and development, thereby producing a printed color image on a sheet of paper from the digital color image data held in the image data register 182. Prior to the printing operation, the image output section 183 converts the image data of RGB code into data of yellow (Y), magenta (M), cyanine (C) and black (K) that are colors of toner used for color printing. The digital color copy machine of this embodiment have separate developing cycles for these toner colors.

Next, the operation of the extraction processor 184, default value determinator 185, default value register 187, image color converter 189, conversion information register 190 and calculation register 191 will be explained.

Figure 20:
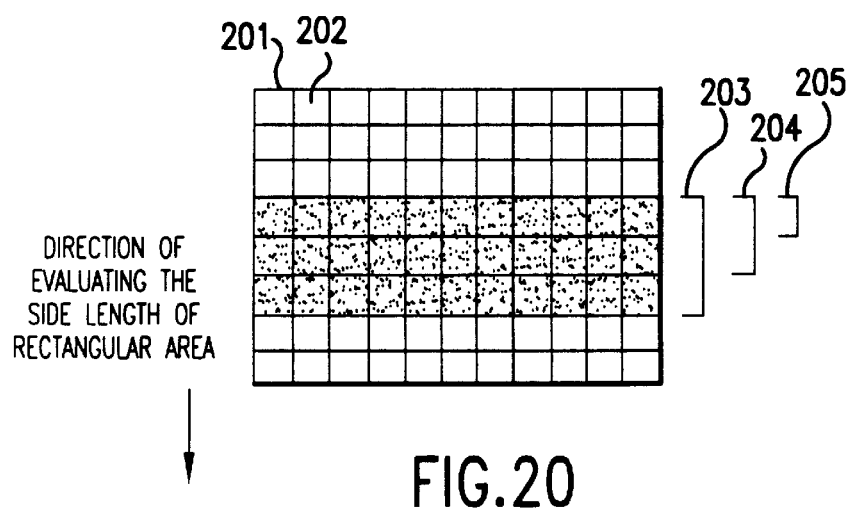
FIG. 20 is a diagram explaining the manner of detection of the thickness of a line by the extraction processor.
Figure 21A:
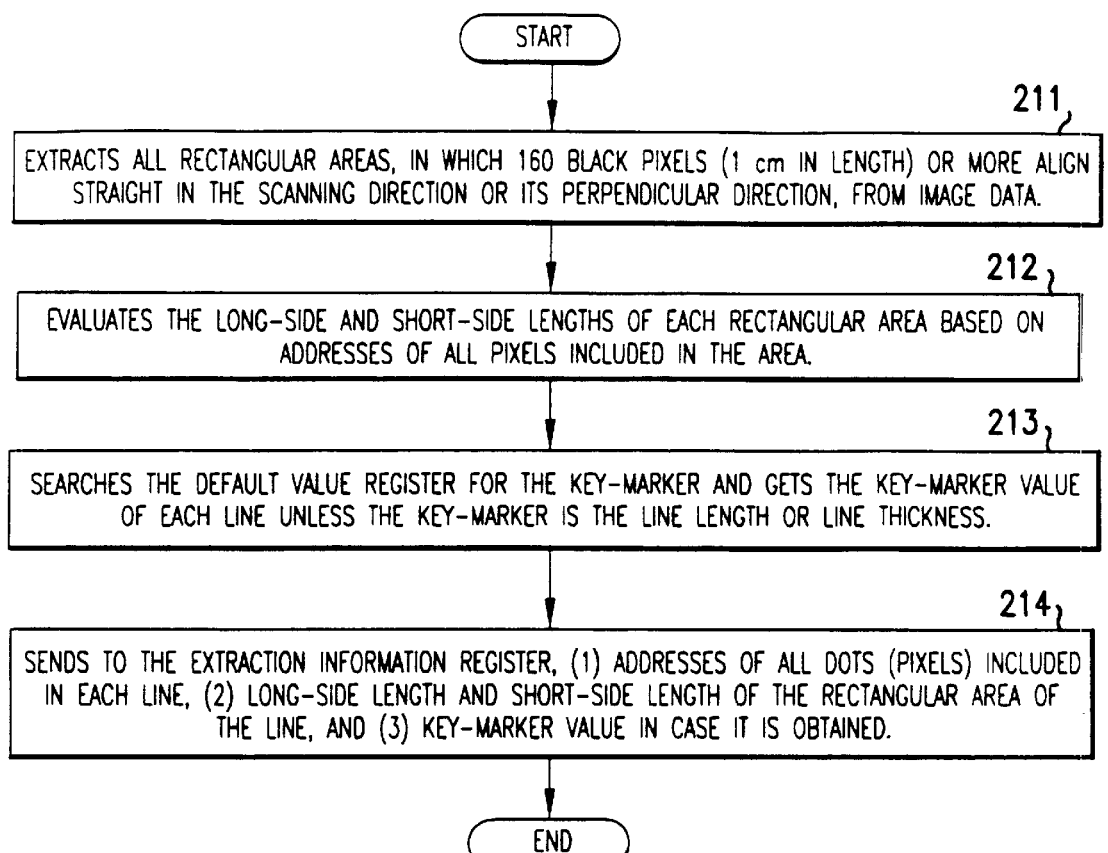
FIG. 21A is a flowchart showing the process of the extraction processor of the fifth embodiment.
Figure 21B:
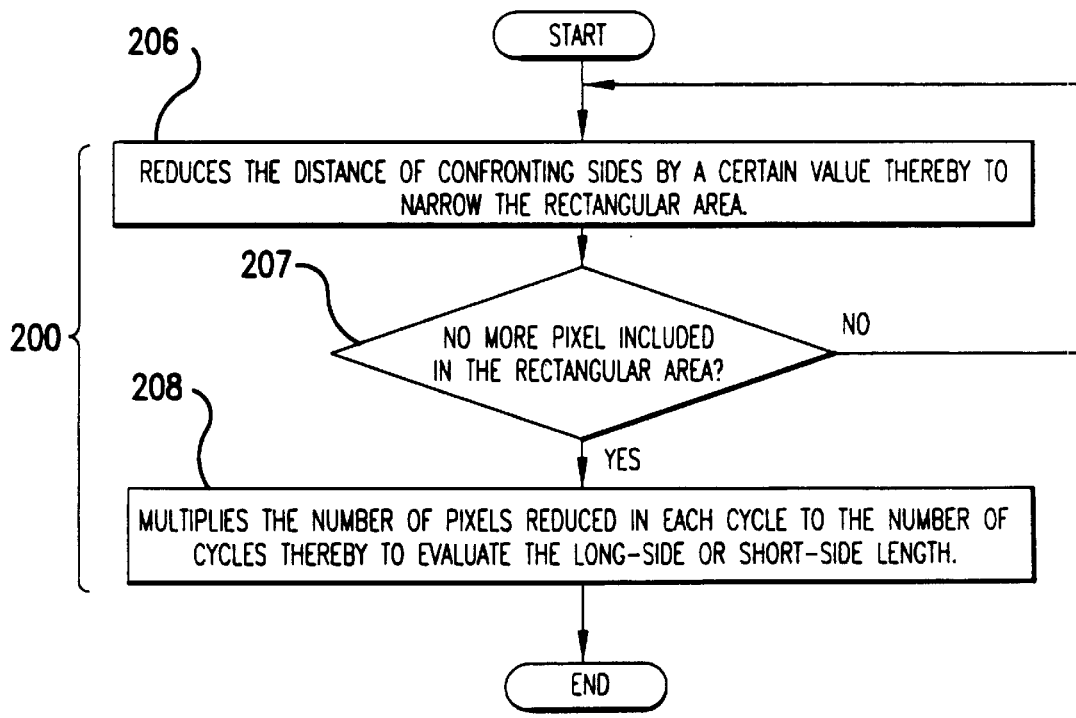
FIG. 21B is a flowchart showing the process of evaluating the side lengths of a rectangular area by the extraction processor of the fifth embodiment.

FIG. 20 and FIGS. 21A and 21B explain the process of the extraction processor 184, of which FIG. 20 explains the manner of discriminating the line thickness, and FIGS. 21A and 21B show by flowchart the process of the extraction processor 184. The process of FIG. 21A identifies a rectangular area to be a line, in which black pixels of a certain number, e.g., 160 pixels (i.e., 1 cm in length) or more align straight, and extracts the position and shape of the line from the document image held in the image data register 182. The process includes a routine for evaluating the lengths of the long side and short side of the rectangular area as shown in FIG. 21B.

As shown in FIG. 20, the position of each pixel is detected in the document image data of pixels 201, 202 and so on to determine a rectangular area and evaluate the side lengths. During the process between step 21 and step 214, the routine 200 (steps 206–208) of FIG. 21B is executed to narrow the rectangular area progressively, and finally the lengths of the long side and short side of the rectangular area are evaluated. Specifically, the first narrowing process for a black pixel band 203 yields a pixel band 204, the second narrowing process for the black pixel band 204 yields a pixel band 205, and the third narrowing process for the pixel band 205 eliminates the pixel band. Accordingly, the side length of this rectangular area is determined to be 3 pixels.

The process of the extraction processor 184 will be explained in detail on the flowchart of FIG. 21A. The first step 211 extracts all rectangular areas, in which 160 black pixels (1 cm in length) or more align straight in the scanning direction or its perpendicular direction, from the document image data held in the image data register 182. In case more than one rectangular area exists contiguously in parallel, all of these areas are determined to be one rectangular area.

The next step 212 evaluates the lengths of the long side and short side of each rectangular area based on the pixel address. The next step 213 searches the default value register 187 for the key-marker and gets the value of key-marker of each line unless the key-marker is the line length or line thickness. The next step 214 sends to the extraction information register 186, (1) addresses of all dots (pixels) included in each line, (2) long-side length and short-side length of the rectangular area of the line, and (3) key-marker value in case obtained in the step 213.

The long-side length and short-side length of a rectangular area are evaluated in steps 206–208 of the routine 200 explained in connection with FIG. 20 and FIG. 21B. The long side and short side of a rectangular area are considered to be the length and thickness of a line, respectively. In the routine 200, the first step 206 reduces the distance of confronting sides by a certain number of pixels thereby to narrows the rectangular area, and the next step 207 tests as to whether there is no more pixels included in the rectangular area. These steps 206 and 207 are repeated until there is no pixel in the area, then the next step 208 multiplies the number of pixels reduced in each cycle to the number of cycles thereby to evaluate the side length in terms of the number of pixels. Eventually, the long-side length and short-side length of the rectangular area are obtained.

In this example, the key-marker of lines in the document image is the line thickness, which is considered to be the short-side length of rectangular area, and therefore the evaluation of key-marker value is not necessary and is not carried out.

Figure 22:
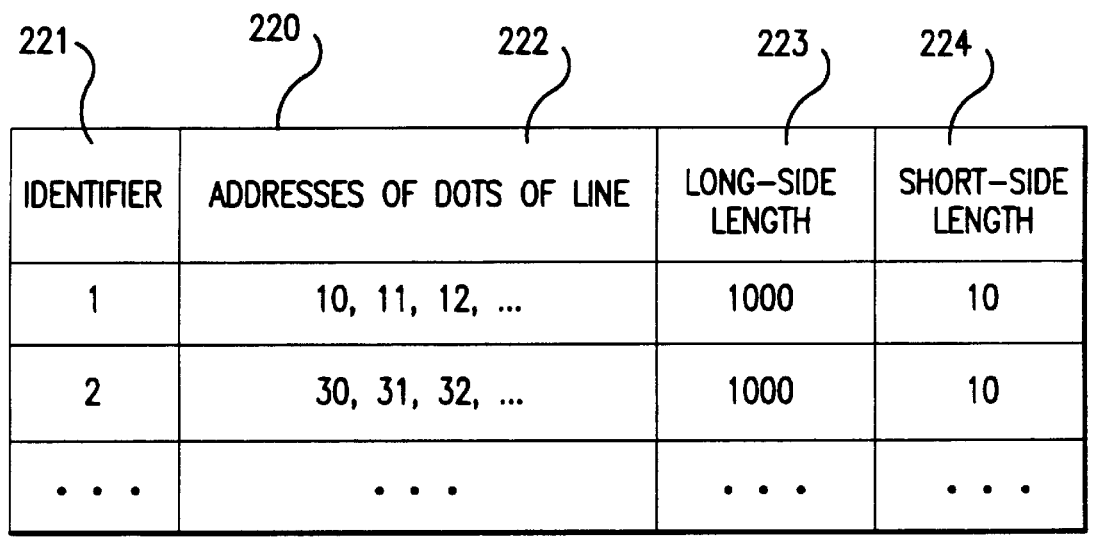
FIG. 22 is a diagram used to explain the data structure of extraction information held by the extraction information register means.

The line information obtained by the process of the extraction processor 184 is held in the extraction information register 186. FIG. 22 shows the data structure of a data table 220 held by the extraction information register 186. The data table 220 includes an identifier field 221 which contains the identifier given to each line, an address field 222 which contains addresses of dots of a line, a long-side field 223 which contains the long-side length of the rectangular area of the line, and a short-side field 224 which contains the short-side length of the line area. The data table 220 may further have a key-marker field when the key-marker value is used.

Figure 23:
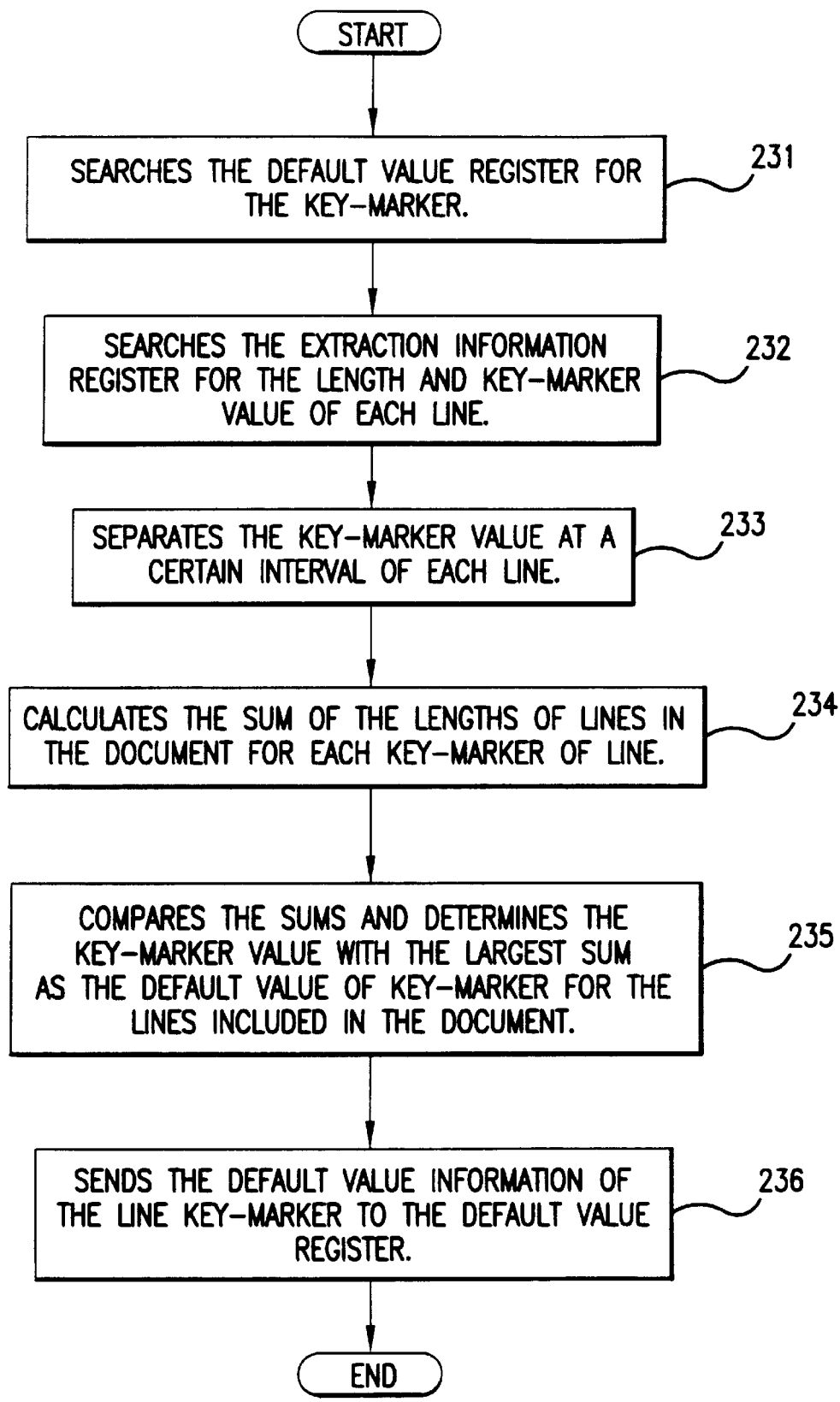
FIG. 23 is a flowchart showing the process of the default value determinator.

Next, the process of the default value determinator 185 will be explained. FIG. 23 shows by flowchart the process of the default value determinator 185 of the fifth embodiment. The digital color copy machine of this embodiment which deals with document image cannot have a default value associated with the document processing, and therefore it determines the default value by using image data read out of the document.

The first step 231 searches the default value register 187 for the key-marker. The next step 232 searches the extraction information register 186 for the lengths and key-marker value of each line extracted from the document image data. The next step 233 separates the key-marker value at a certain interval of each line in order to minimize the influence of the document reading error. The next step 234 calculates the sum of the lengths of lines in the document for each key-marker of line, and the next step 235 compares the sums and determines the key-marker value with the largest sum as the default value of key-marker for the lines included in the document. The next step 236 sends the determined default value of key-marker to the default value register 187. The default value register 187 holds the received default value, e.g., "10 pixels," for the key-marker "thickness of line." In this example of the alteration of the scheme of emphasis and distinction for lines in a document, the conversion information register 190 holds conversion data that is sets of original key-marker values (conditions) and revisional set-markers and key-marker values. FIG. 24 shows an example of the conversion table held in the conversion information register 190. The conversion table 240 includes a original key-marker condition field 241, a revisional set-marker (color) value field 242, and a revisional key-marker (thickness) value field 243. Although the conversion table 240 has a 24-bit (3-byte) data structure for the color information, it stores the color information in terms of the RGB code ranging from "0" to "255." The condition of key-marker is as to whether the original line thickness is greater than or smaller than the default value.

Figure 25:
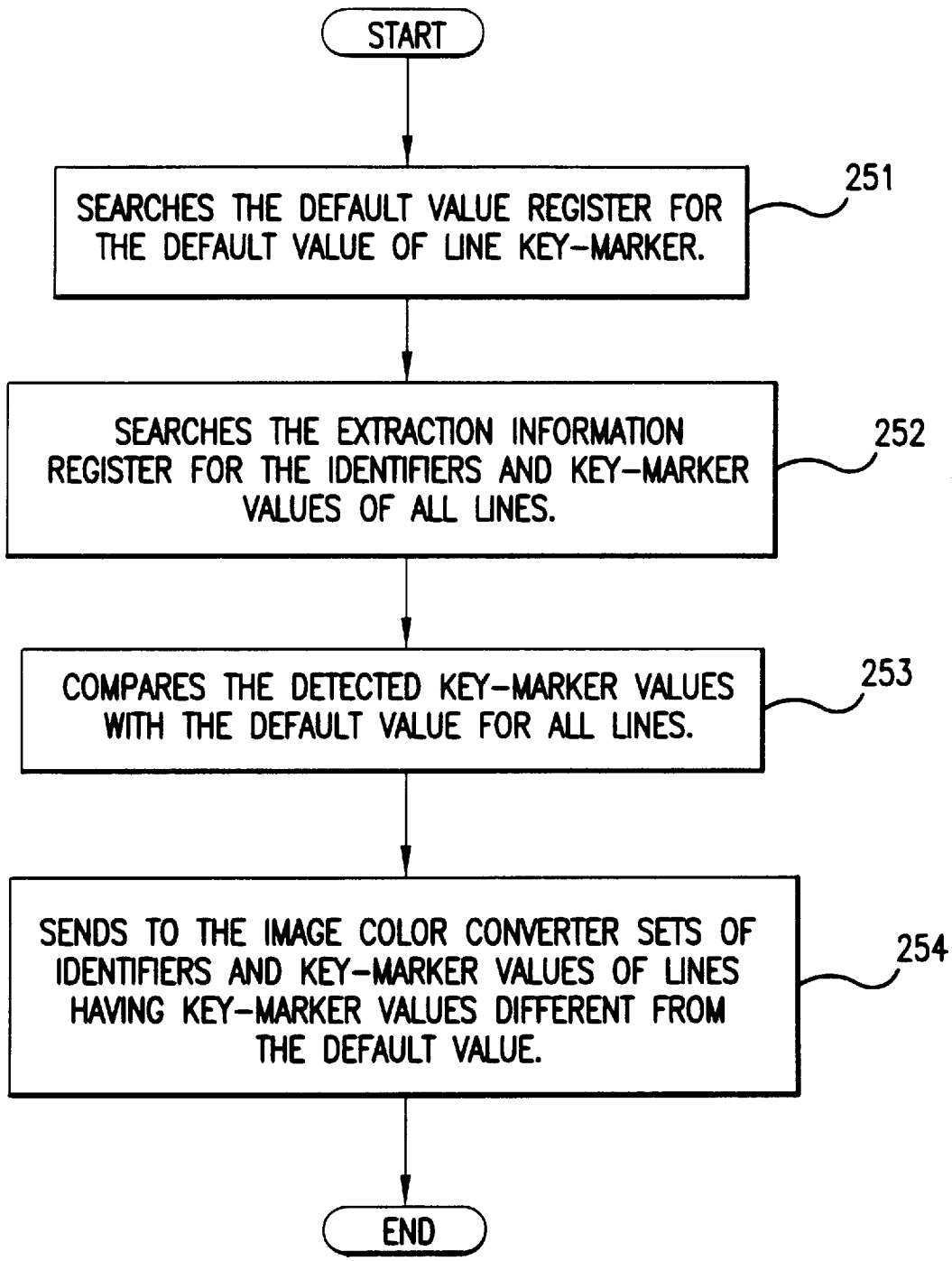
FIG. 25 is a flowchart showing the process of the discrimination processor.

Next, the operation of the discrimination processor 188 will be explained. FIG. 25 shows by flowchart the process of the discrimination processor 188 which detects the difference of the extracted key-marker from the default value and directs the image color converter 189 to convert the image color.

The first step 251 searches the default value register 187 for the default value of the key-marker of line. The next step 252 searches the extraction information register 186 for the identifiers and key-marker values of all lines. The next step 253 compares the detected key-marker values with the default value for all lines, and the last step 254 sends to the image color converter 189 sets of identifiers and key-marker values of lines having key-marker values different from the default value.

Figure 26:
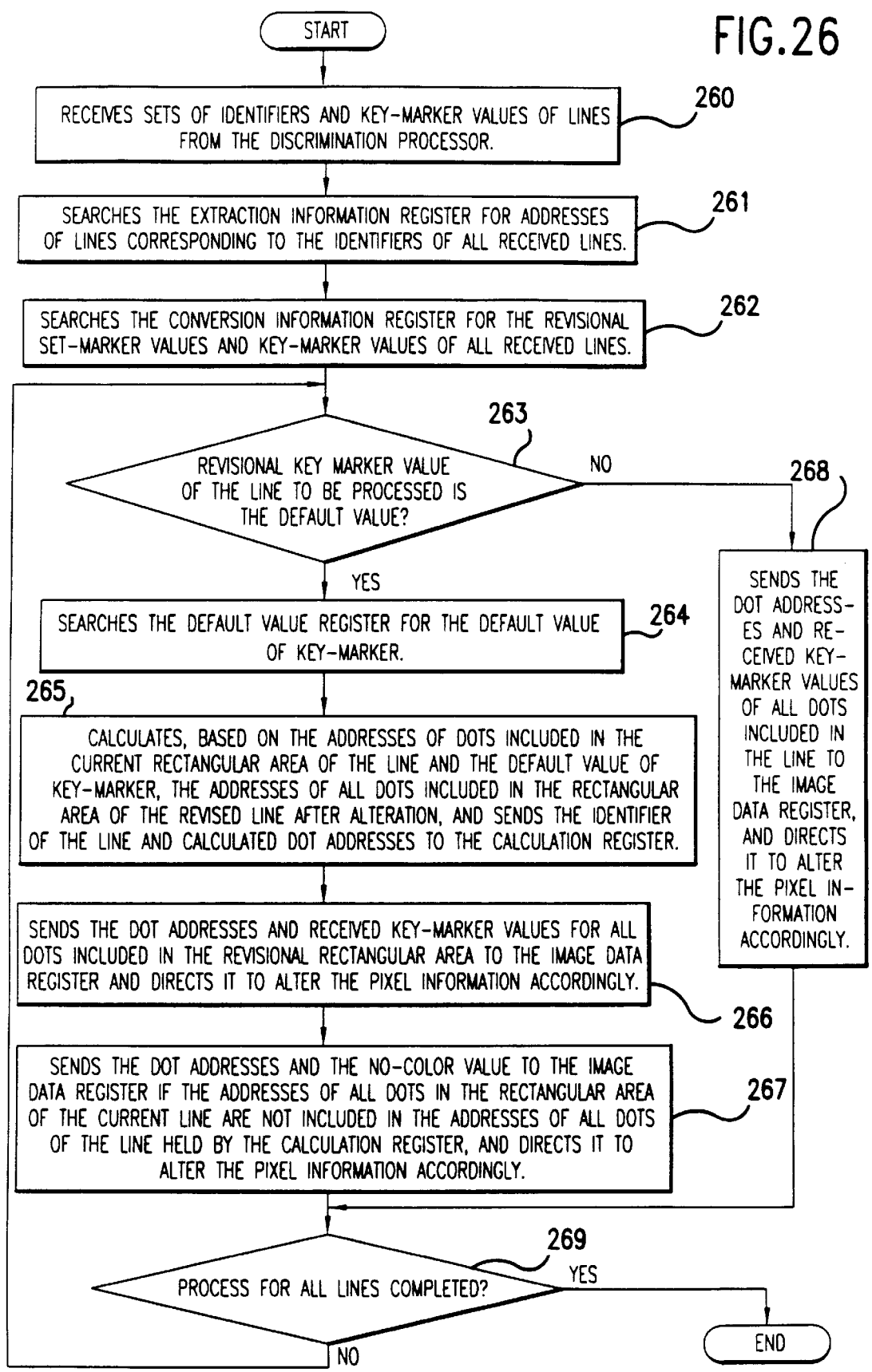
FIG. 26 is a flowchart showing the process of the image color converter.

The image color converter 189 implements the line color conversion process for the document image data held in the image data register 182 in accordance with the information provided by the discrimination processor 188. FIG. 26 shows by flowchart the process of the image color converter 189. The first step 260 receives sets of identifiers and key-marker values of lines. The next step 261 searches the extraction information register 186 for addresses of lines corresponding to the identifiers of all received lines. The next step 262 searches the conversion information register 190 for the revisional set-marker values and key-marker values of all received lines.

The next step 263 judges for lines to be processed as to whether or not the revisional key-marker value is the default value. In case the revisional key-marker value is the default value, the subsequent steps 264–267 are carried out, or otherwise the sequence proceeds to step 268.

The step 264, of the case of the revisional default key-marker value, searches the default value register 187 for the default value of key-marker of the line. The next step 265 calculates, based on the addresses of dots included in the current rectangular area of the line and the default value of key-marker, the addresses of all dots included in the rectangular area of the revised line, and sends the identifier of the line and calculated dot addresses to the calculation register 191.

The next step 266 sends the dot addresses and key-marker values received in step 262 for all dots included in the revisional rectangular area to the image data register 182, and directs it to alter the pixel information accordingly. If all dot addresses of the current rectangular area of line are not included in the addresses of all dots for the line held by the calculation register 191, the next step 267 sends the dot addresses and the no-color value to the image data register 182, and directs it to alter the pixel information accordingly. The sequence proceeds to step 269 thereafter.

If, on the other hand, the revisional key-marker value is not the default value for the line under process, the sequence proceeds to step 268, and if the revisional key-marker value is intact for the line, it sends the dot addresses and received key-marker values of all dots included in the line to the image data register 182, and directs it to alter the pixel information accordingly. The sequence proceeds to step 269 thereafter. The step 269 tests whether or not the process for all lines has completed, and the sequence returns to step 263 to repeat the process for the next line or terminates the process on completion of all lines.

In this manner, the image color converter 189 implements the process for converting the color of lines of the document image data held in the image data register 182 in accordance with the information provided by the discrimination processor 188. The calculation register 191, which is accessed by the image color converter 189, receives the line identifier and addresses of dots included in the revisional rectangular area of the line with that identifier, and holds these information.

Figure 27:
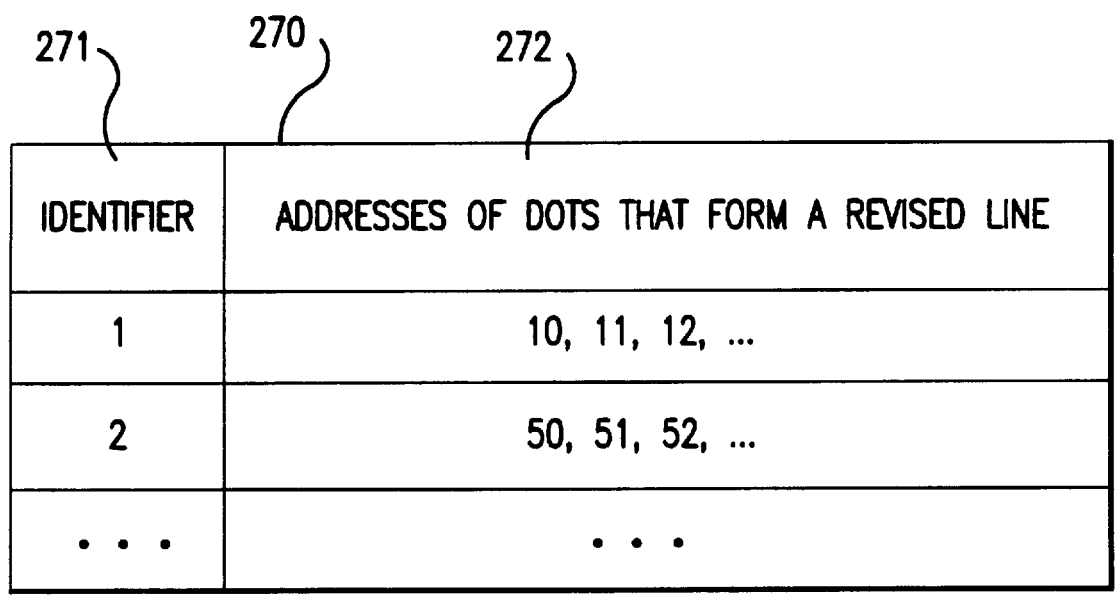
FIG. 27 is a diagram showing an example of information held by the calculation register means.

FIG. 27 shows an example of the information held by the calculation register 191. It holds, as a correspondence table of calculation information 270 for the line under process, identifier 271 of the line and addresses 272 of dots that form the revisional line.

Figure 28:
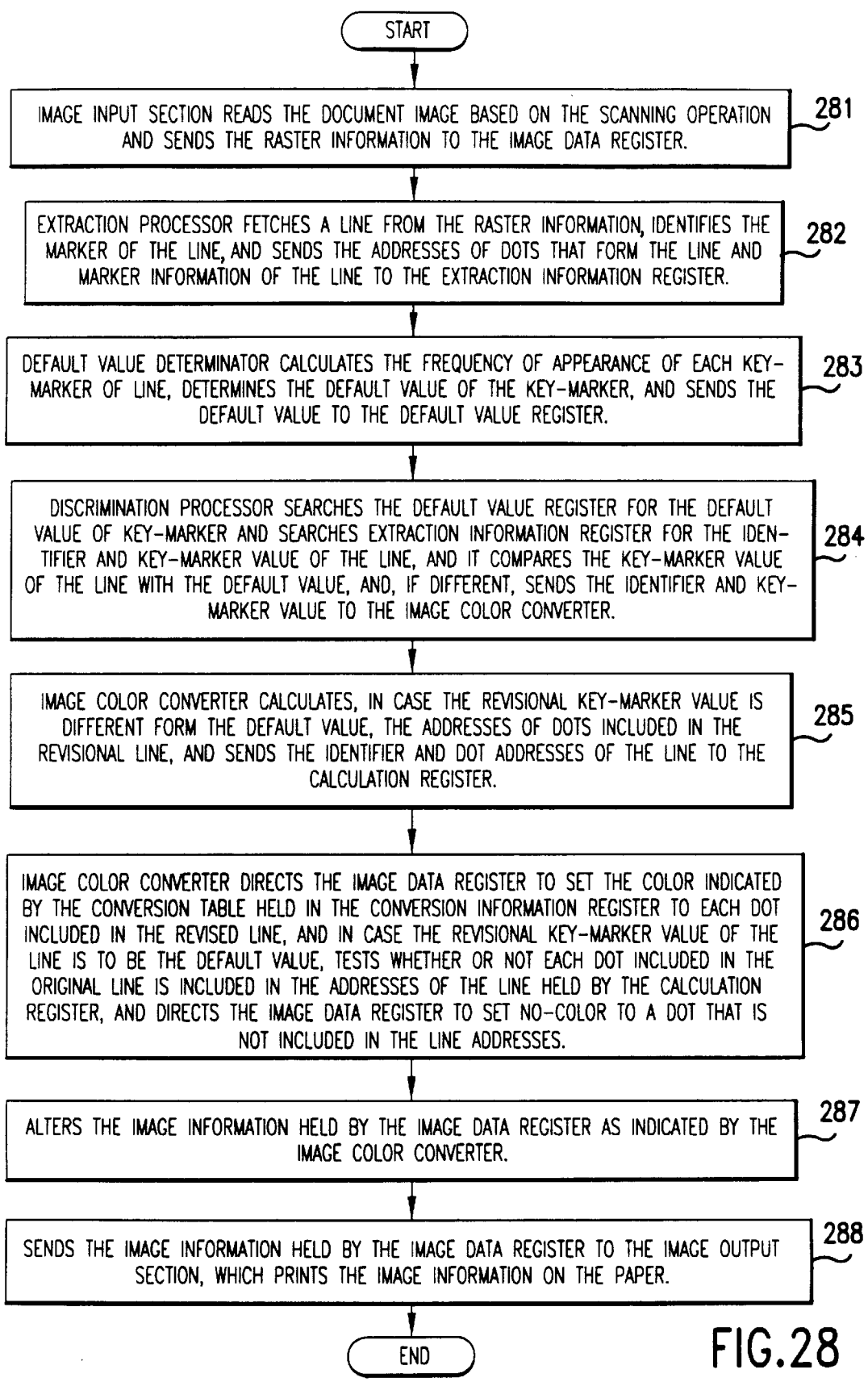
FIG. 28 is a flowchart showing the process of altering the emphasizing scheme based on the fifth embodiment.

Next, the operation of emphasis scheme alteration by the digital color copy machine of this embodiment will be explained. FIG. 28 shows by flowchart the process of emphasis scheme alteration.

The user who intends to alter the emphasizing scheme for a document places the document so that it is read by the image input section 181 and instructs the reading of document to start the process. The first step 281 of the process of the image input section 181 reads the document image based on the scanning operation and transfers the resulting raster information to the image data register 182.

The next step 282 of the process of the extraction processor 184 fetches a line from the raster information held in the image data register 182, identifies the marker of the line, and transfers the addresses of dots that form the line and marker information of the line to the extraction information register 186.

The next step 283 of the process of the default value determinator 185 calculates the frequency of appearance of each key-marker of line, determines the default value of the key-marker, and sends the resulting default value of key-marker to the default value register 187.

The next step 284 of the process of the discrimination processor 188 searches the default value register 187 for the default value of key-marker and searches extraction information register 186 for the identifier and key-marker value of the line. It compares the key-marker value of the line with the default value, and, if different, sends the identifier and key-marker value to the image color converter 189.

The next step 285 of the process of the image color converter 189 calculates, in case the revisional key-marker value is different from the default value, the addresses of dots included in the revisional line, and sends the identifier and dot addresses of the line to the calculation register 191.

The next step 286 of the image color converter 189 directs the image data register 182 to set the color indicated by the conversion table held in the conversion information register 190 to each dot included in the revisional line. In case the revisional key-marker value of the line is to be the default value, the step 286 tests whether or not each dot included in the original line is included in the addresses of the line held by the calculation register 191, and directs the image data register 182 to set no-color to the dot that is not included in the line addresses.

The next step 287 alters the image information held by the image data register 182 as indicated by the image color converter 189, and the next step 288 sends the image information held by the image data register 182 to the image output section 183, which prints the image information on a sheet of paper.

The following explains specifically the variation of document as a result of the alteration of emphasizing scheme. FIG. 29 explains an example of the switching of the emphasizing scheme from the line thickness scheme to the line color scheme for a document. An original monochrome document 290 shown in the upper section of the figure uses lines of two kinds of thickness. Based on the calculation of line length, the smaller line thickness is designated to be the default value of key-marker. The converting process for the document image based on the conversion table having the setting shown in FIG. 24 yields a document 293 shown in the lower section of the figure. Specifically, for the original document 290 including thicker lines 291 and thinner lines 292, the thinner lines 292 having the thickness of the default value are left unchanged for their thickness and color, whereas the thicker lines 291 have their color altered to the color of R=32, G=32 and B=128, with the thickness being left unbalanced, based on the record of the conversion table 240, resulting in lines 294. The color and shape of characters are not altered.

Accordingly, the digital color copy machine of this embodiment enables the user to easily switch the scheme of emphasis and distinction for frames of tables or bars of graphs in a document from the line thickness scheme to the line color scheme or add the line color scheme to the line thickness scheme. The digital color copy machine of this embodiment can be modified as follows.

(1) Key-marker of line

The key-marker of lines may include the type of line (solid line, dashed line, dash-dot line, etc.) besides the thickness of line. The type of line is discriminated based on the positional relation between rectangular areas filled with dots. The extraction information register 186 receives the value of key-marker from the extraction processor 184 and holds it.

(2) Determination of the default value of line marker

The default value of line marker may be determined based on the weighted summation of line lengths instead of the simple summation of line lengths.

(3) Conversion table held by the conversion information register 190

The conversion table may more finely classify the thickness of line in terms of the difference from the default value, for example, instead of as to whether the line thickness is simply greater than or smaller than the default value in the case shown in FIG. 24.

The digital color copy machine of the fifth embodiment which deals with image data and the document processing system of the first embodiment have the correspondence of system components as follows. The image data register 182 and extraction information register 186 compare to the element register 12, the extraction processor 184, default value determinator 185 and discrimination processor 188 compare to the search processor 15, and the image color converter 189, conversion information register 190 and calculation register 191 compare to the setting processor 17 and setting scheme register 18.

[EMBODIMENT 6]

In contrast to the switching of the scheme of emphasis and distinction for lines with thicknesses different from the default value to the multicolor scheme in the digital color copy machine of the fifth embodiment, an alternative arrangement as the sixth embodiment of this invention is intended for switching from the multicolor scheme to the multi-shape scheme for lines with colors different from the default value so that a document having the multicolor scheme of emphasis and distinction can be clearly emphasized even in the form of a monochrome document.

The digital color copy machine of this embodiment deals with image data directly and processes pixel data in the same manner as the preceding fifth embodiment. The key-marker is the color of line and the set-marker is the thickness of line in this embodiment. The marker for lines is the thickness of line, and it is the shorter side-length of a rectangular area filled with dots that form the line.

Figure 30:
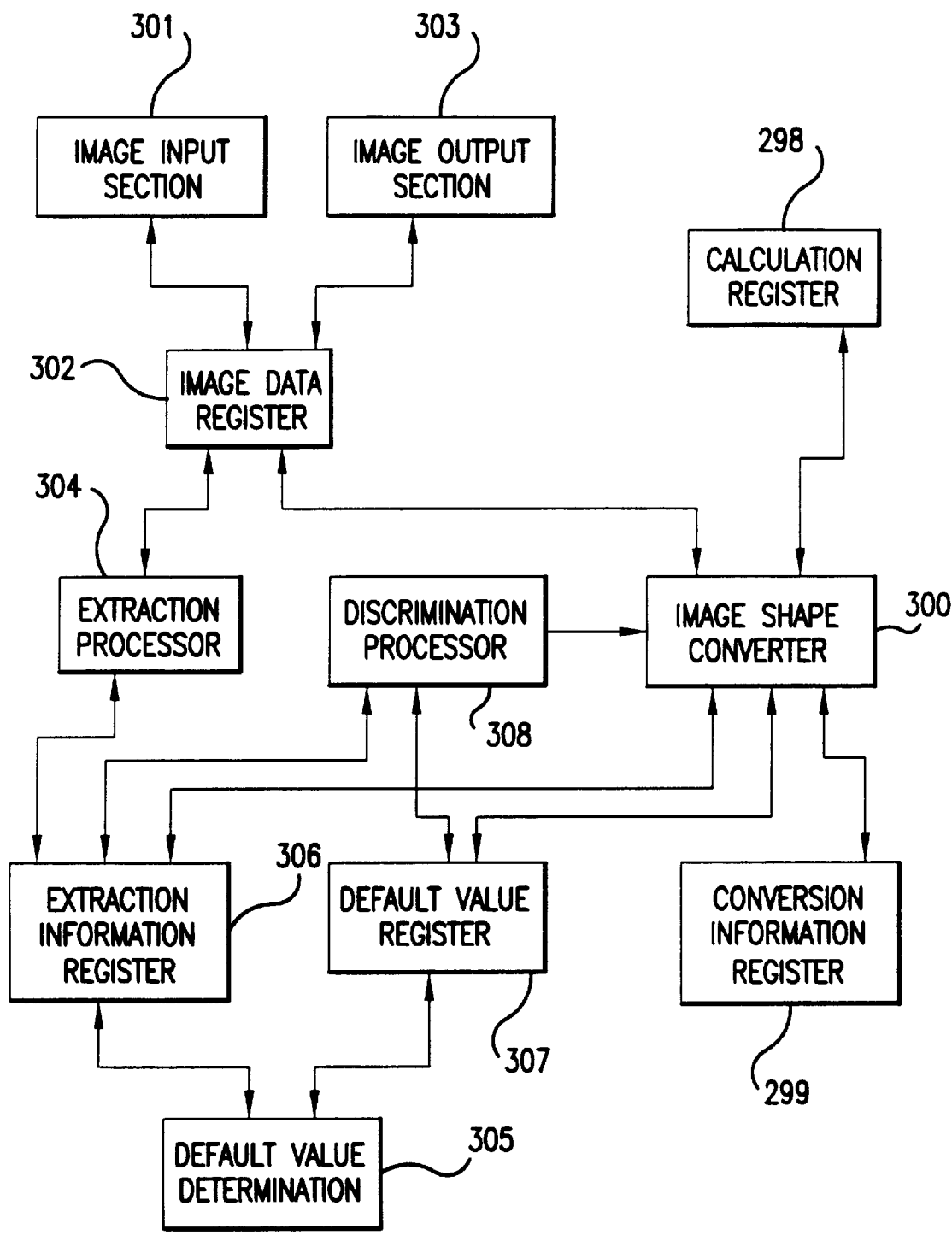
FIG. 30 is a block diagram of the document processing system (digital color copy machine) based on the sixth embodiment of this invention.

FIG. 30 shows by block diagram the configuration of the major system components of the document processing system (digital color copy machine) based on the sixth embodiment of the invention. The system includes a calculation register 298, a conversion information register 299, an image shape converter 300, an image input section 301, an image data register 302, an image output section 303, an extraction processor 304, a default value determinator 305, an extraction information register 306, a default value register 307, and a discrimination processor 308. Among these system components, the image input section 301, image data register 302, image output section 303, extraction processor 304, default value determinator 305, extraction information register 306, default value register 307, discrimination processor 308, image shape converter 300, conversion information register 299 and calculation register 298 are correspondent and identical to the image input section 181, image data register 182, image output section 183, extraction processor 184, default value determinator 185, extraction information register 186, default value register 187, discrimination processor 188, image color converter 189, conversion information register 190 and calculation register 191 of the fifth embodiment.

The digital color copy machine of this embodiment differs from that of the fifth embodiment in the provision of the image shape converter 300 in place of the image color converter 189. In addition, the conversion information register 299, default value register 307, extraction processor 304 and extraction information register 306 hold and transact values (data) different from those of the counterparts of the fifth embodiment due to their different key-markers and set-markers, as will be explained in the following, although their functions are identical.

Next, the image shape converter 300 which is a distinct system component of this digital color copy machine will be explained. The default value register 307 holds information "color" as a key-marker of line. It receives default value of line key-marker, e.g., R=128, G=128 and B=140, from the default value determinator 305 and holds the value.

In the digital color copy machine of this embodiment which performs the alteration of the scheme of emphasis and distinction for lines in the document image from the line color to the line thickness, the conversion information register 299 holds conversion data that are sets of the original values (conditions) of key-marker and information of the revisional set-marker and key-marker values (indication as to whether or not the key-marker is to be the default value).

Figure 31:
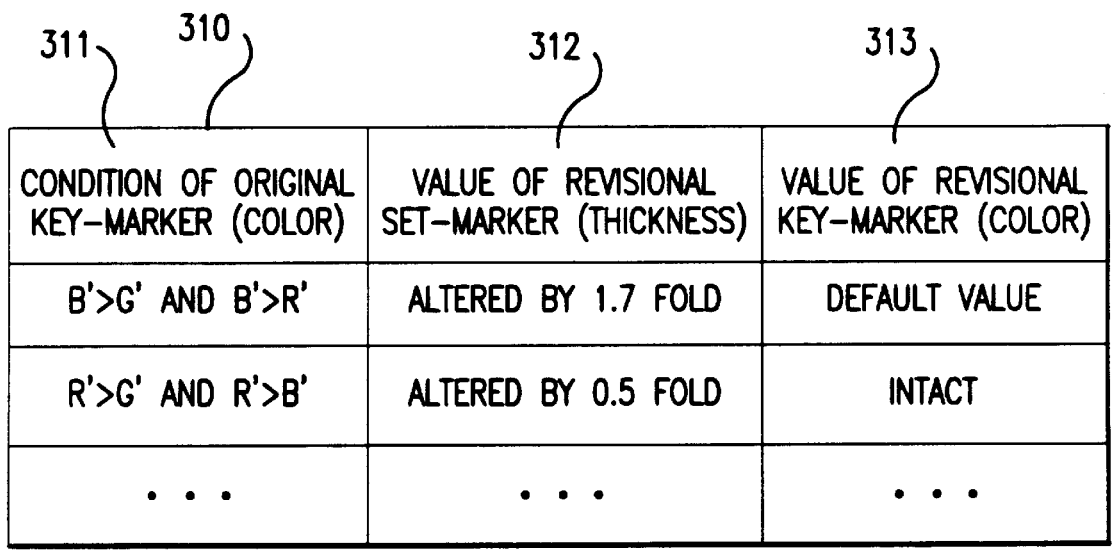
FIG. 31 is a diagram showing an example of the conversion table in the conversion information register means of the sixth embodiment.

FIG. 31 shows an example of the conversion table held in the conversion information register 299. The conversion table 310 has a condition field 311 which stores an original key-marker (color information), a shape value field 312 which stores a revisional value of setting form (thickness), and a color value field 313 which stores a revisional key-marker value (color). The conversion table 310 uses, for the original key-marker (color information), the comparison of the difference of RGB values between the original color and the default value. In the following explanation, in regard to the RGB value, B' denotes the result of subtraction of the default value B from the original color value B, and R' and G' have the same sense.

The extraction processor 304 implements the process for determining the value of line color similar to the process of the extraction processor 184 in the system of the fifth embodiment, and sends the line color value to the extraction information register 306.

FIG. 32 explains the data structure of a data table 320 which stores the line information extracted by the extraction processor 304 and held by the extraction information register 306. The data table 320 has an identifier field 321, an address field 322, a long-side length field 323, a short-side length field 324, and a color information field 325. The addresses of dots which form a line, the long-side and short-side lengths of the rectangular area of the line, and its color data are stored in a row of the table. Specifically, the identifier field 321 stores the identifier appended to each line, the address field 322 stores the addresses of dots of the line, the long-side length field 323 stores the long-side length of the rectangular area of the line, the short-side length field 324 stores the short-side length of the line area, and the color information field 325 stores the value of line color. Although the table 320 has a 24-bit (3-byte) data structure for the color information, it stores the color information in terms of the RGB code ranging from 0 to 255, as mentioned previously.

Figure 33:
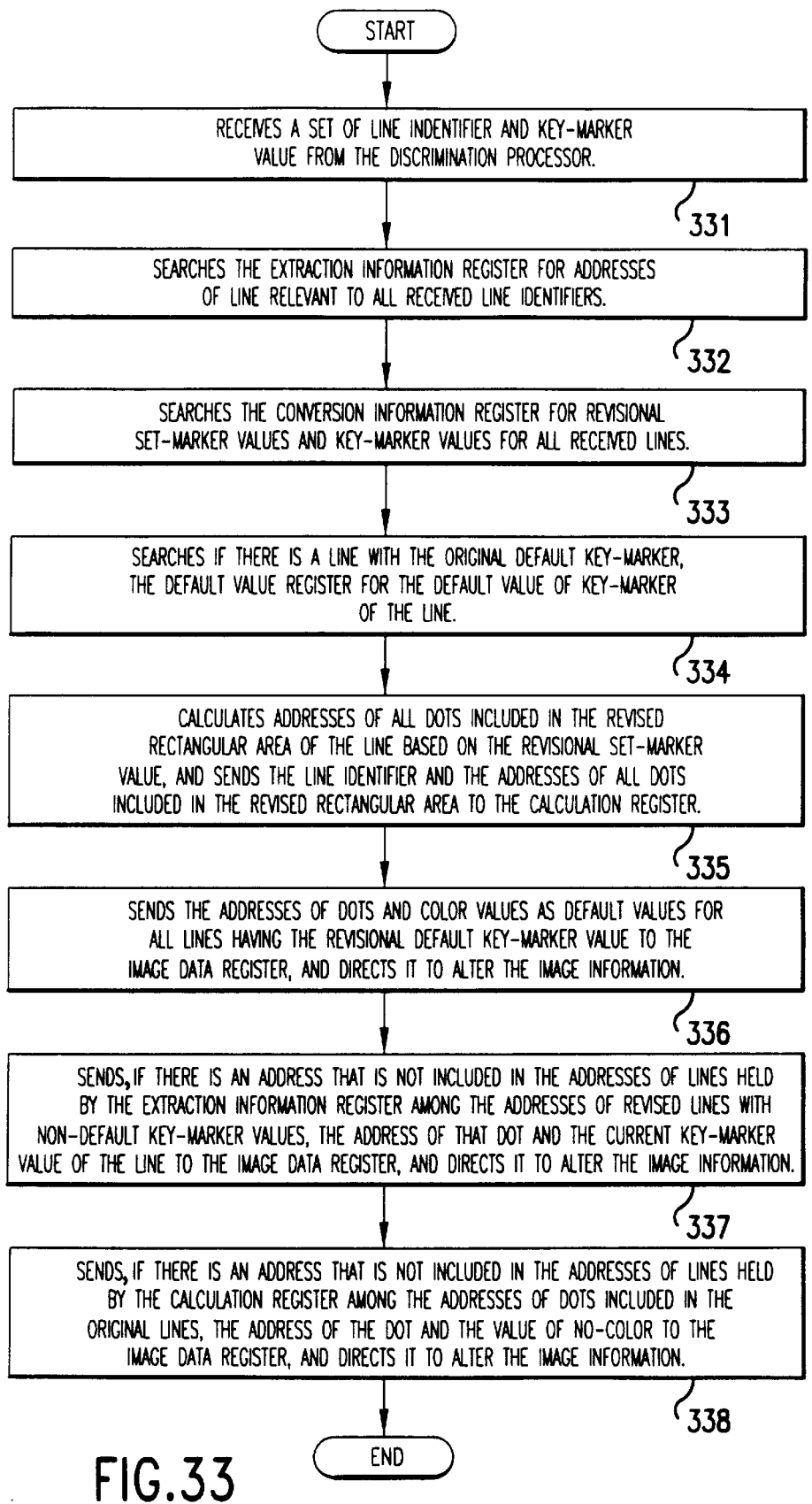
FIG. 33 is a flowchart showing the process of the image shape converter.

The image shape converter 300 implements the process for converting the color of line image for the document image data held in the image data register 302 in accordance with the information provided by the discrimination processor 308. FIG. 33 shows by flowchart the process of the image shape converter 300.

The first step 331 receives a set of line identifier and key-marker value from the discrimination processor 308. The next step 332 searches the extraction information register 306 for addresses of line relevant to all received line identifiers. The next step 333 searches the conversion information register 299 for revisional set-marker values and key-marker values for all received lines.

If there is a line with the original default key-marker, the next step 334 searches the default value register 307 for the default value of key-marker of the line, and the next step 335 calculates addresses of all dots included in the revised rectangular area of the line based on the revisional set-marker value and sends the line identifier and the addresses of all dots included in the revisional rectangular area to the calculation register 298.

The next step 336 sends the addresses of dots and color values as default values for all lines having the revisional default key-marker value to the image data register 302, and directs it to alter the image information accordingly.

If there is an address that is not included in the addresses of lines held by the extraction information register 306 among the addresses of the revisional lines with non-default key-marker values, the next step 337 sends the address of that dot and the current key-marker value of the line to the image data register 302, and directs it to alter the image information accordingly.

If there is an address that is not included in the addresses of lines held by the calculation register 298 among the addresses of dots included in the original lines, the last step 338 sends the address of the dot and the value of no-color to the image data register 302, and directs it to alter the image information accordingly.

Figure 34:
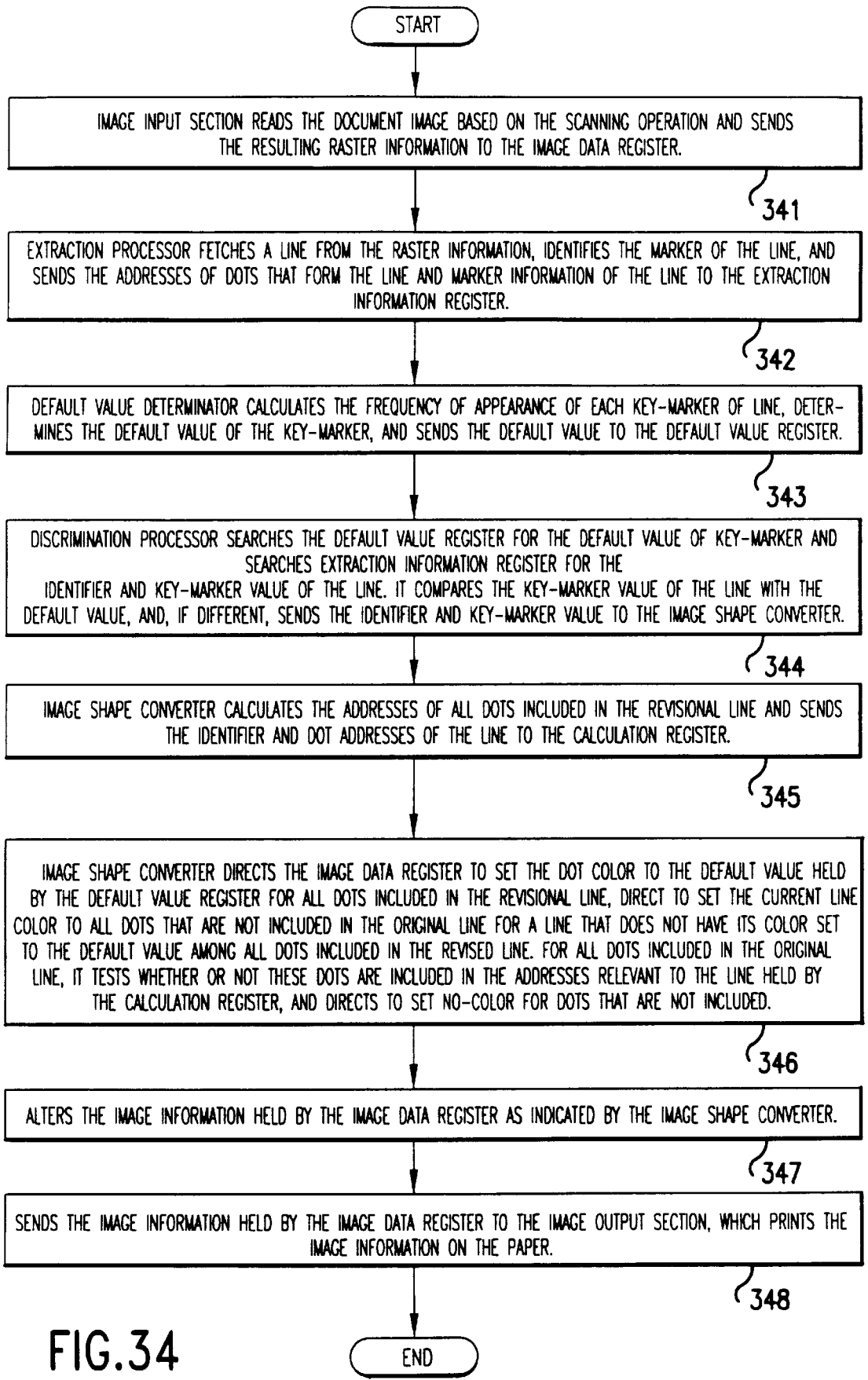
FIG. 34 is a flowchart showing the process of altering the emphasizing scheme of the sixth embodiment.

Next, an example of the operation of emphasis scheme alteration by the digital color copy machine of this embodiment will be explained. FIG. 34 shows by flowchart the process of emphasis scheme alteration based on this embodiment. The user who intends to alter the emphasizing scheme from the color scheme to the line thickness scheme for a color document places the document so that it is read by the image input section 301 and instructs the reading of document to start the process. The first step 341 of the process of the image input section 301 reads the document image based on the scanning operation and transfers the resulting raster information to the image data register 302.

The next step 342 of the process of the extraction processor 304 fetches a line from the raster information held in the image data register 302, identifies the marker of the line, and transfers the addresses of dots that form the line and marker information of the line to the extraction information register 306. The next step 343 of the process of the default value determinator 305 calculates the frequency of appearance of each key-marker of line, determines the default value of the key-marker, and sends the resulting default value of key-marker to the default value register 307.

The next step 344 of the process of the discrimination processor 308 searches the default value register 307 for the default value of key-marker and searches extraction information register 306 for the identifier and key-marker value of the line. It compares the key-marker value of the line with the default value, and, if different, sends the identifier and key-marker value to the image shape converter 300.

The next step 345 of the process of the image shape converter 300 calculates the addresses of all dots included in the revisional line, and sends the identifier and dot addresses of the line to the calculation register 298.

The next step 346 of the image shape converter 300 directs the image data register 302 to set the dot color to the default value held by the default value register 307 for all dots included in the revisional line. For a line that does not have its color set to the default value, it is directed to set the current line color to all dots that are not included in the original line among all dots included in the revisional line. For all dots included in the original line, it is tested whether or not these does are included in addresses relevant to the line held by the calculation register 298, and it is directed to set no-color for dots that are not included.

The next step 347 alters the image information held by the image data register 302 as indicated by the image shape converter 300, and the next step 348 sends the image information held by the image data register 302 to the image output section 303, which prints the image information on a sheet of paper.

The following explains specifically the variation of document as a result of the alteration of emphasizing scheme to the line thickness scheme. FIG. 35 explains an example of switching of the emphasizing scheme from the line color scheme to the line thickness scheme for a document. An original color document 350 shown in the upper section of the figure uses lines of two different colors. As a result of line length calculation, lines 351 with RGB values 128, 128 and 140 are longer than lines 352 with RGB values 25, 25 and 180, and therefore the RGB values of the former lines are designated to be the default value.

The converting process for the document image based on the conversion table having the setting shown in FIG. 31 yields a document 353 shown in the lower section of FIG. 35. As shown by the original document 350 and revised document 353 in the figure, the lines 352 having the default RGB values 128, 128 and 140 in the original document 350 are left unchanged for their color and thickness in the revised document 353, whereas the lines 351 having the default RGB values 25, 25 and 180 are altered to have the default color of R=128, G=128 and B=140 and have their thickness increased by 1.7 times based on the data set in the conversion table 310 in the revised document 353. Nothing is altered for characters.

Accordingly, the digital color copy machine of this embodiment enables the user to easily switch the scheme of emphasis and distinction for frames of tables or bars of graphs in a document from the line color scheme to the line thickness scheme or add the line thickness scheme to the line color scheme. The digital color copy machine of this embodiment can be modified as follows.

(1) Set-marker of line

The set-marker of line may include the type of line (solid line, dashed line, dash-dot line, etc.) besides the thickness of line.

(2) Conversion table held by the conversion information register 299

The conversion table 310 may classify the color information in terms of the polarity of RGB values between the original color and default color for example, instead of the differential values between the RGB values of the original color and default color.

In the foregoing fifth and sixth embodiments, the correspondence of the original key-marker values and the revisional set-markers and key-marker values is determined by the conversion table 240 (310) held by the conversion information register 190 (299), an alternative arrangement is to allow the user to instruct this correspondence. In this case, the system is provided with a component of the user interface function which displays a user entry field on the screen and transfers the user's input instruction to the image shape converter 300 or image color converter 189, and the conversion information register 190 or 299 is not used.

Figure 36:
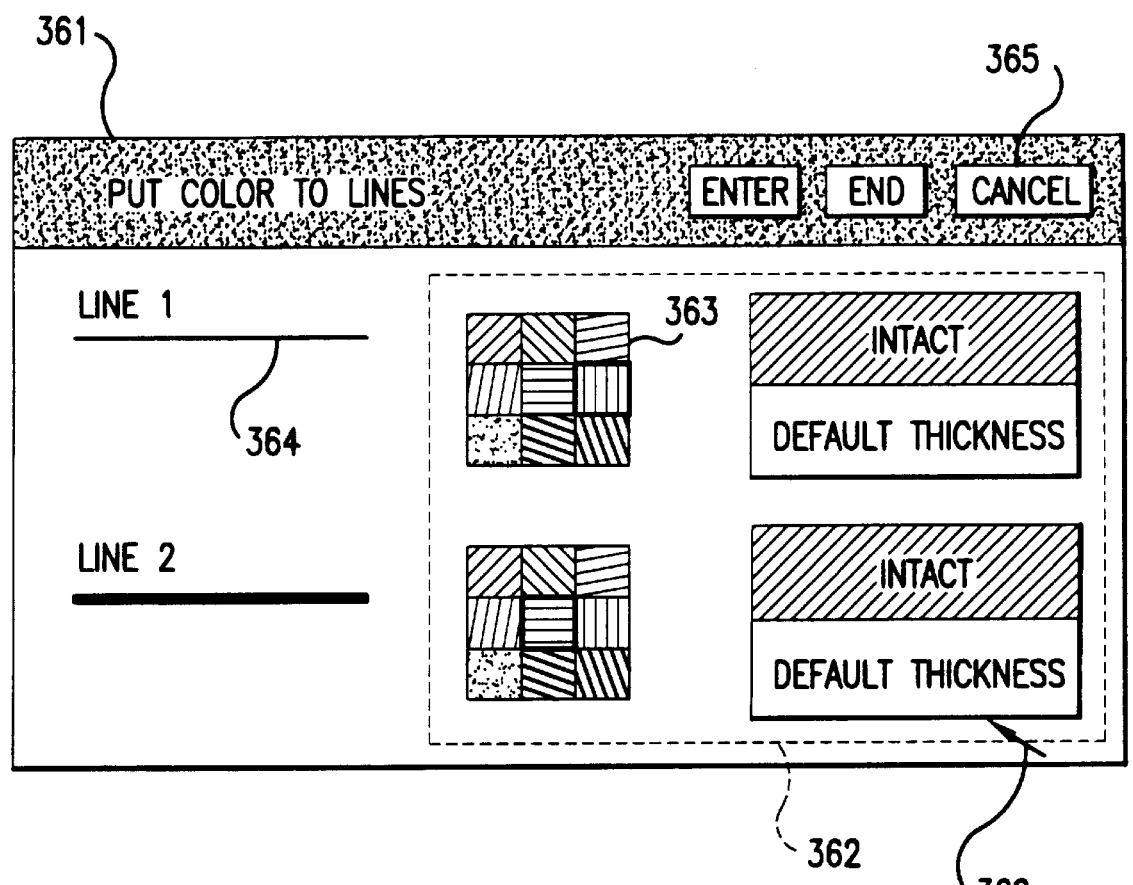
FIG. 36 is a diagram showing an example of the screen created by the system component for providing the user interface function for entering the correspondence between the original key-marker values and the revisional set-markers and key-marker values.

FIG. 36 shows an example of the user interface screen created by the system component which provides the interface function for allowing the user to enter the original key-marker value and revisional set-marker and key-marker value. The user interface screen 361 includes a user entry field 362, and a list 364 of the original values of key-marker (line thickness) is displayed on the left. The user enters a revisional set-marker (line color) and key-marker value (line thickness) in correspondence to the listed value. Color patches 363 are displayed for allowing the user to select a color in this example.

Although the copy machines of the foregoing fifth and sixth embodiments implement the conversion of the color and shape of lines that are parallel to or perpendicular to the scanning direction, it is possible to deal with oblique lines. In this case, in order to extract a rectangular area of line and calculate its long-side and short-side lengths, the system is provided with additional components for implementing the processes of extracting a rectangular area which forms an oblique line, determining the side lengths of the rectangular area, and altering the area.

The system component for extracting a rectangular area which forms an oblique line will be explained first. A rectangular area of oblique line is extracted based on the sequential process of detecting for each black pixel as to whether or not the four adjacent pixels are black.

Figure 37:
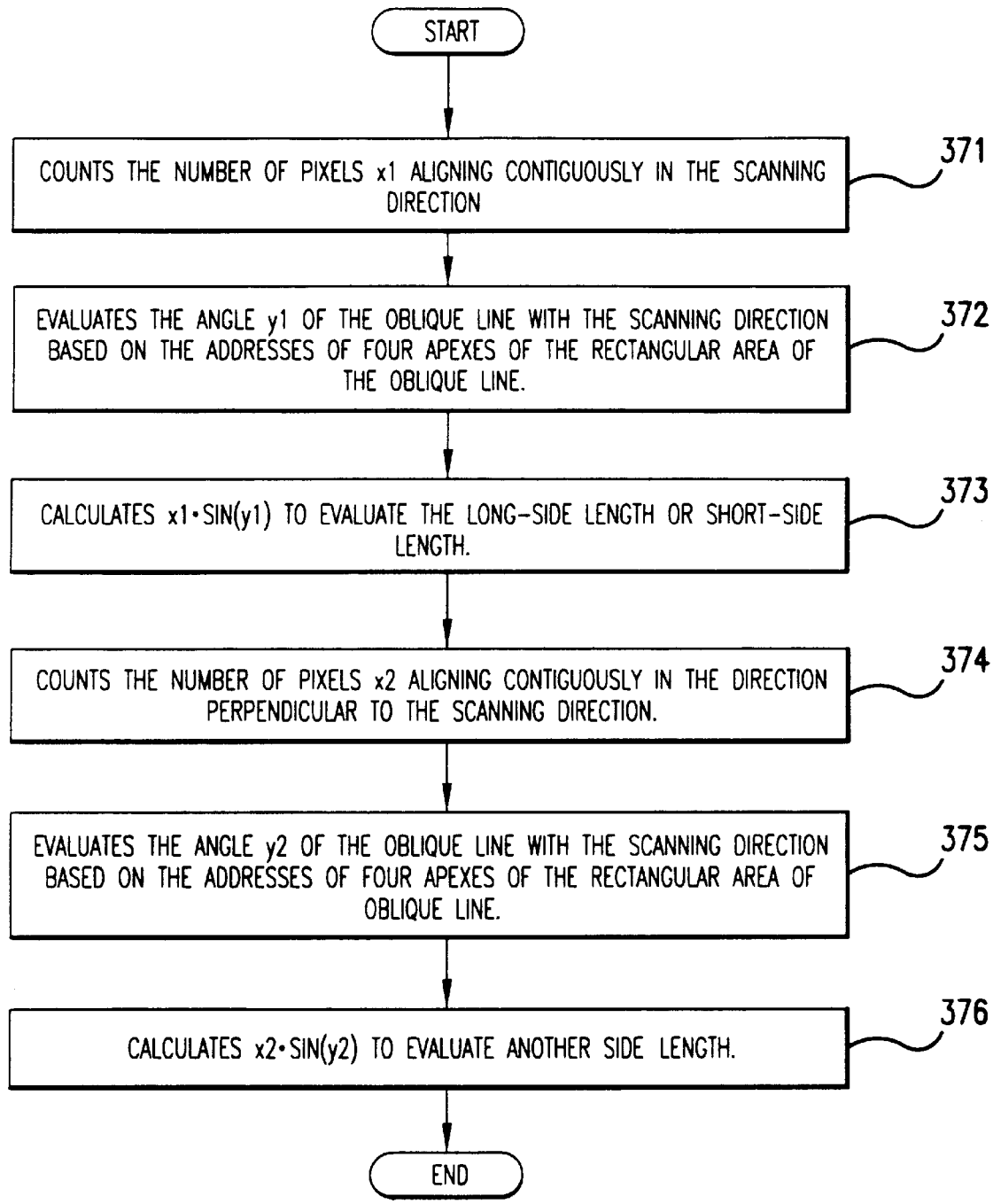
FIG. 37 is a flowchart explaining an example of the process of determining the side lengths of a rectangular area of oblique line.

FIG. 37 explains by flowchart the process of evaluating the side lengths of a rectangular area of oblique line. The first step 371 counts the number of pixels x1 aligning contiguously in the scanning direction. The next step 372 evaluates the angle y1 of the oblique line with the scanning direction based on the addresses of four apexes of the rectangular area of oblique line. The next step 373 calculates x1·sin (y1) to evaluate the long-side length or short-side length.

The calculation process for the direction perpendicular to the scanning direction is repeated thereby to evaluate another side length. Specifically, the next step 374 counts the number of pixels x2 aligning contiguously in the direction perpendicular to the scanning direction, the next step 375 evaluates the angle y2 of the oblique line with the scanning direction based on the addresses of four apexes of the rectangular area of oblique line, the next step 375 calculates x2·sin (y2) to evaluate another side length.

For the alteration of the rectangular area of oblique line, the address of the revised area can be calculated from the side angles and lengths of the rectangular area. Accordingly, the copy machines of the fifth and sixth embodiments, which are designed to switch or add the scheme of emphasis and distinction for lines of tables and bars of graphs running in the scanning direction or its perpendicular direction, are capable of performing this function for oblique lines of polygonal graphs by the additional provision of the extraction processor for extracting a rectangular area of oblique line as described above.

The digital color copy machines of the foregoing fifth and sixth embodiments can have the additional provision of a system component for determining the default value of set-marker based on the document image so that the image color converter 189 or image shape converter 300 can designate revisional set-marker values other than the default value for document elements. Consequently, document elements with key-markers other than the default value will have revisional set-markers other than the default value at a higher probability, whereby the emphasis and distinction of document elements can be more clarified.

This variant embodiment is particularly effective in the case of the determination of revisional set-markers by the user (refer to FIG. 36). In this case, default values of set-markers prepared in advance are displayed thereby to prompt the user to specify values other than the default values. For example, on the user interface screen shown in FIG. 36, colors of set-markers excluding the default value (default color) are displayed as color patches.

The digital color copy machines of the foregoing fifth and sixth embodiments can be modified to determine the default value of set-marker based on the document image as follows.

(1) The extraction processor 184 (304) determines a set-marker value concurrently to the determination of a key-marker value at the extraction of a line. The value of the set-marker, when it is the line thickness or color, is determined in the same manner as the preceding embodiments.

(2) The system is provided additionally with components having a function of determining a default value of set-marker and a function of holding the default value, such as the default value determinator 185 (305) and default value register 187 (307). Calculations carried out by these system components are basically identical to those of the default value determinator 185 (305) and default value register 187 (307), except that they deal with the set-marker instead of the key-marker.

(3) The image color converter 189 or image shape converter 300 determines a revisional set-marker value based on the instruction entered by the user or the search of the conversion information register 190 (299) by excluding the default value of set-marker.

Based on these modifications, the digital color copy machines of the fifth and sixth embodiments are capable of determining the default value of set-marker based on the document image, allowing the user to switch or add the scheme of emphasis and distinction for the document image based on the data retrieved from the document without the need of prior data setting, thereby having a clear print of the document image.

As described above for various embodiments of invention, the inventive document processing system is operative by switching or adding schemes of emphasis and distinction including the monochrome multi-shape scheme and multicolor scheme through the generation of correspondence between the original and revisional information on the color and shape. Consequently, even if the input device and output device of a document creating system do not function consistently in terms of the character shape and color, the user can fully use their individual input and output functions.

What is claimed is:

1. A document processing system comprising:
   first information containing a first visual feature of a first element of a document;
   second information containing a second visual feature of the first element of the document;
   element information register means which holds the first information and the second information which determine the visual features of the document element;
   first default value register means which holds a default value of the first information;
   discrimination means which detects whether or not the first information of a document element held by said element information register means is different from the default value; and
   setting means which alters the second information for a document element when that document element has first information different from the default value.

2. A document processing system according to claim 1, wherein said setting means sets the second information for a document element with first information that is different from the default value and sets the first information of said document element to be a default value.

3. A document processing system according to claim 1, further including a document layout means which alters the layout of a document element in response to the alteration of the first information or second information of a document element held in said element information register means.

4. A document processing system according to claim 1, further including first analysis means which determines a default value of the first information by using the first information of a document element held in said element information register means.

5. A document processing system according to claim 1, further including second analysis means which determines a default value of the second information by using the second information of a document element held in said element information register means.

6. A document processing system according to claim 1, wherein said setting means lets the user specify in interactive manner the correspondence between the first information before the alteration and the second information and first information after the alteration.

7. A document processing system according to claim 1, further including setting register means which holds information indicative of the correspondence between the first information before the alteration and the second information and first information after the alteration,
   wherein said setting means implements the setting by using the information held by said setting register means.

8. A document processing system according to claim 1, wherein a document element to be treated is a character or a line of a figure or a table.

9. A document processing system according to claim 1, wherein the information which determines the visual feature of a document element handles the shape or color of a character or line.

10. A document processing system according to claim 1, wherein the first information which determines the visual feature of a document element handles the shape of the document element and the second information which determines the visual feature of the document element handles the color.

11. A document processing system according to claim 1, wherein the first information which determines the visual feature of a document element handles the color of the document element and the second information which determines the visual feature of the document element handles the shape of the document element.

12. A document processing system comprising:
   first information containing a first visual feature of a first element of a document;
   second information containing a second visual feature of the first element of the document;
   element information register means which holds the first information and the second information which determine the visual features of the document element;
   first default value register means which holds a first default value of the first information;
   second default value register means which holds a second default value of the second information;
   discrimination means which detects whether or not the first information of a document element held by said element information register means is different from the default value of the first information; and
   setting means which alters the second information for a document element to the second default value when that document element has first information different from the first default value.

13. A document processing system comprising:
   first information containing at least one of a first element of a document and first element layout information on a general restriction on a layout of the first element;
   second information containing at least one of a second element of the document and second element layout information on a general restriction on the layout of the second element;
   element information register means which holds the first information and the second information which determine the visual features of the document element;
   first default value register means which holds a default value of the first information;
   discrimination means which detects whether or not the first information of a document element held by said element information register means is different from the default value; and
   setting means which alters the second information for a document element when that document element has first information different from the default value.

14. A document processing system comprising:
   first information containing at least one of a first element of a document and first element layout information on a general restriction on a layout of the first element;
   second information containing at least one of a second element of the document and second element layout information on a general restriction on the layout of the second element;
   element information register means which holds the first information and the second information which determine the visual features of the document element;
   first default value register means which holds a first default value of the first information;
   second default value register means which holds a second default value of the second information;
   discrimination means which detects whether or not the first information of a document element held by said element information register means is different from the default value of the first information; and
   setting means which alters the second information for a document element to the second default value when that document element has first information different from the first default value.

15. A document processing system according to claim 14, wherein said setting means sets the second information for a document element with first information that is different from the default value and sets the first information of said document element to be a default value.

16. A document processing system according to claim 14, further including a document layout means which alters the layout of a document element in response to the alteration of the first information or second information of a document element held in said element information register means.

17. A document processing system according to claim 14, further including first analysis means which determines a default value of the first information by using the first information of a document element held in said element information register means.

18. A document processing system according to claim 14, further including second analysis means which determines a default value of the second information by using the second information of a document element held in said element information register means.

19. A document processing system according to claim 14, wherein said setting means lets the user specify in interactive manner the correspondence between the first information before the alternation and the second information and first information after the alteration.

20. A document processing system according to claim 14, further including setting register means which holds information indicative of the correspondence between the first information before the alteration and the second information and first information after the alteration,
   wherein said setting means implements the setting by using the information held by said setting register means.

21. A document processing system according to claim 14, wherein a document element to be treated is a character or a line of a figure or a table.

22. A document processing system according to claim 14, wherein the information which determines the visual feature of a document element handles the shape or color of a character or line.

23. A document processing system according to claim 14, wherein the first information which determines the visual feature of a document element handles the shape of the document element and the second information which determines the visual feature of the document element handles the color.

24. A document processing system according to claim 14, wherein the first information which determines the visual feature of a document element handles the color of the document element and the second information which determines the visual feature of the document element handles the shape of the document element.

\* \* \* \* \*